(12) United States Patent
Berntorp et al.

(10) Patent No.: US 10,324,469 B2
(45) Date of Patent: Jun. 18, 2019

(54) SYSTEM AND METHOD FOR CONTROLLING MOTION OF VEHICLE IN SHARED ENVIRONMENT

(71) Applicant: Mitsubishi Electric Research Laboratories, Inc., Cambridge, MA (US)

(72) Inventors: Karl Berntorp, Watertown, MA (US); Kazuhide Okamoto, Atlanta, GA (US); Stefano Di Cairano, Newton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 80 days.

(21) Appl. No.: 15/471,665

(22) Filed: Mar. 28, 2017

(65) Prior Publication Data

US 2018/0284785 A1 Oct. 4, 2018

(51) Int. Cl.

| G05D 1/02 | (2006.01) |
|---|---|
| G06N 3/08 | (2006.01) |
| G08G 1/01 | (2006.01) |
| G08G 1/16 | (2006.01) |
| B60W 30/08 | (2012.01) |
| G06K 9/00 | (2006.01) |

(52) U.S. Cl.
CPC .......... *G05D 1/0214* (2013.01); *B60W 30/08* (2013.01); *G05D 1/021* (2013.01); *G06K 9/00825* (2013.01); *G06N 3/08* (2013.01); *G08G 1/0112* (2013.01); *G08G 1/166* (2013.01); *G05D 1/0278* (2013.01)

(58) Field of Classification Search
CPC ....... G05D 1/0214; G06N 3/08; G08G 1/0112
See application file for complete search history.

(56) References Cited

U.S. PATENT DOCUMENTS

| 8,543,261 | B2 | 9/2013 | Anderson et al. |
|---|---|---|---|
| 2010/0280726 | A1 | 11/2010 | Stabrey et al. |
| 2014/0088855 | A1 | 3/2014 | Ferguson et al. |
| 2015/0344030 | A1 | 12/2015 | Damerow et al. |
| 2016/0109571 | A1 | 4/2016 | Zeng et al. |
| 2016/0327953 | A1 | 11/2016 | Nillson et al. |
| 2017/0016848 | A1 | 1/2017 | Smithyman et al. |

FOREIGN PATENT DOCUMENTS

| EP | 1898232 A1 | 3/2008 |
|---|---|---|
| JP | 2005215878 | 8/2005 |

*Primary Examiner* — Basil T. Jos
(74) *Attorney, Agent, or Firm* — Gennadiy Vinokur; James McAleenan; Hironori Tsukamoto

(57) ABSTRACT

A method controls a motion of the host vehicle in the environment according to a trajectory and adjusts the trajectory of the vehicle based on the levels of risk posed by the motion of other vehicles. The method determines a set of feasible trajectories of hypothetical vehicles traveling in a driving area of the host vehicle and determines a level of risk of each feasible trajectory as a combination of the probability of the feasible trajectory to intersect with the trajectory of the host vehicle and the probability of the feasible trajectory to be followed by at least one vehicle. The method adjusts the trajectory of the host vehicle in response to assessing the levels of risk of the feasible trajectories.

19 Claims, 29 Drawing Sheets

| Possible intentions of the driver |
|---|
| 210d  Turn left |
| 220d  Turn right |
| 230d  Drive straight |
| 240d  Change lane left |
| 250d  Change lane right |
| 260d  Brake |
| 270d  Accelerate |
| 280d  Maintain velocity |

FIG. 2D

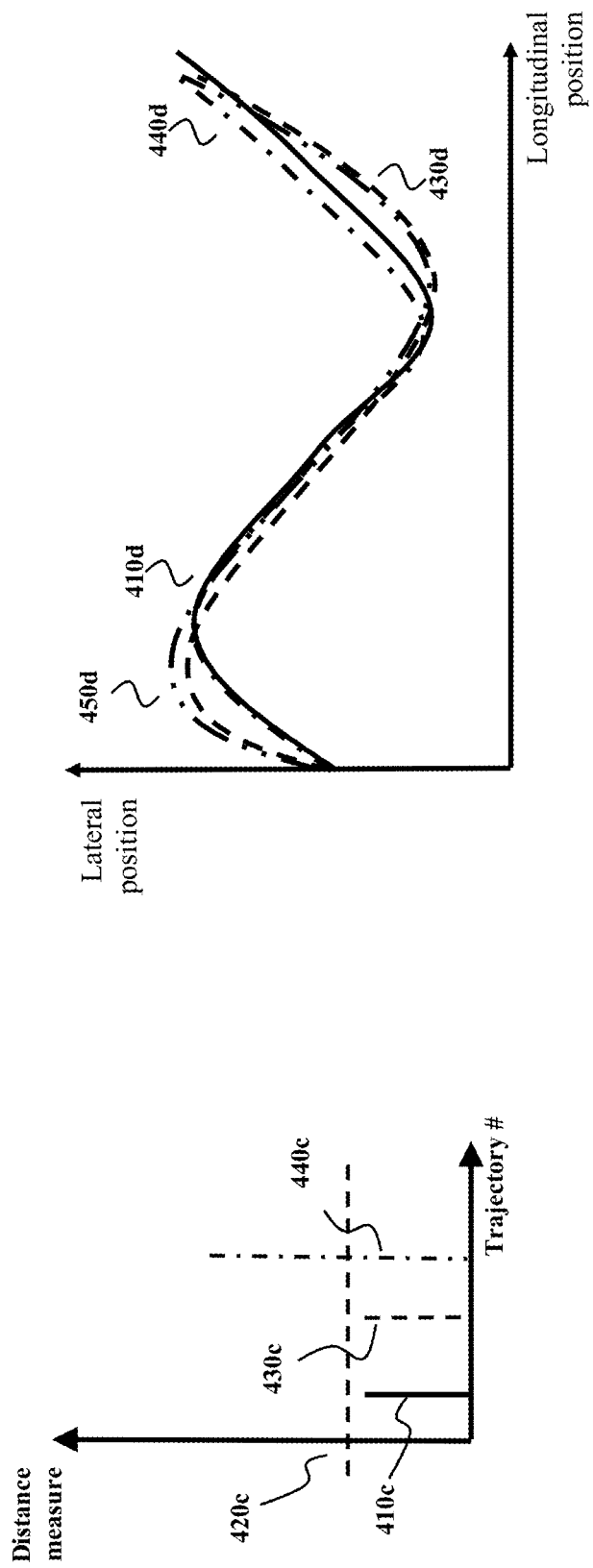

| Possible intentions of the driver | |
|---|---|
| 810 | Turn left |
| 820 | Turn right |
| 830 | Drive straight |
| 840 | Change lane left |
| 850 | Change lane right |
| 860 | Brake |
| 870 | Accelerate |
| 880 | Maintain velocity |

FIG. 8A

SYSTEM AND METHOD FOR CONTROLLING MOTION OF VEHICLE IN SHARED ENVIRONMENT

TECHNICAL FIELD

The invention relates generally to autonomous driving and advanced driver-assistance systems, and, more particularly, to controlling the motion of vehicle taking in consideration the risk posed by the motions of other vehicles traveling in the shared environment.

BACKGROUND

Reliable localization and motion prediction is a key component for autonomous driving and advanced driver-assistance systems (ADAS). For example, one component in an autonomous vehicle and ADAS is the motion planner, which takes information about the surroundings and computes a trajectory profile to navigate towards a goal location, often in presence of moving obstacles. As another example, ADAS, such as lane-change systems, need accurate information about where other vehicles are located, both at the current time, but also for some future time.

To that end, modern vehicles sometimes include a threat assessment and/or collision avoidance systems that employ object detection sensors that are used to enable collision warning or avoidance and other active safety applications. The object detection sensors may use any of a number of technologies, such as short range radar, long range radar, cameras with image processing, laser or LiDAR, ultrasound, etc. The object detection sensors detect vehicles and other objects in the path of a host vehicle, and the application software uses the object detection information to provide warnings or take actions as appropriate. In many vehicles, the object detection sensors are integrated directly into the front bumper or other fascia of the vehicle.

However, even with information about motion of moving vehicles, the threat assessment and/or collision avoidance are difficult tasks. For example, a system described in U.S. Pat. No. 8,543,261 B2 considers the threat assessment by generating optimal vehicle states and generating a threat assessment based for those optimal states. However, compute optimal paths may be computationally prohibitive, especially in complex environments.

In U.S. 2016/0109571, the threat assessment is based on a predicted trajectory of the host vehicle using the motion dynamics of the vehicle and multiple returned scan points of detected objects and computing the risk of each detected object intersecting the predicted path of the ego vehicle. However, to predict each vehicle is computationally prohibitive when there are many detected objects in the region of interest.

Accordingly, there is a need for a system and a method that an estimate a risk posed by the motions of other vehicles in the shared environment in a computationally efficient manner.

SUMMARY

Some embodiments are based on recognition that vehicles traveling in the environment shared with the host vehicle pose a threat to the host vehicle only when the vehicles are moving along the trajectories intersecting the trajectory of the host vehicle. This statement, however, can be reversed leading to the understanding that a hypothetical trajectory that intersects with the trajectory of the host vehicle poses a threat to the host vehicle only if there is another vehicle that travels along that hypothetical trajectory.

Some embodiments are based on realization that it is possible and computationally more efficient to evaluate the danger of the trajectories to the host vehicle rather than to evaluate the danger of the motion of other vehicles to the host vehicle. This is because there is limited number of feasible trajectories imposed by the drivable area, road traffic and/or map of the environment. These feasible trajectories can be pre-computed in a computationally efficient manner and it is easier to test whether the vehicle follows the pre-computed trajectory rather than to generate all possible trajectories for the moving vehicle. In such a manner, the problem of generating the optimal trajectories is replaced with the assigning and/or classification problem, which is computationally more efficient.

Some embodiments are based on realization that the intersection of a feasible trajectory with the trajectory of the host vehicle can be determined probabilistically. In such a manner, the feasible trajectory can be represented by a probability density function to cover a wider space of a drivable area, thereby reducing a number of feasible trajectories to generate. Similarly, the assignment of the vehicle to a feasible trajectory can also be determined probabilistically to represent the uncertainty of the measurements of the motion, possibility of rapid change of the driving intention of a driver of the vehicle, and possibility of motion along segments that belong to multiple trajectories.

To that end, some embodiments determine a level of risk of a feasible trajectory as a combination of a probability of the feasible trajectory to intersect with the trajectory of the host vehicle and a probability of the feasible trajectory to be followed by at least one vehicle.

Some embodiments are based on understanding that the probability of the vehicle to follow the feasible trajectory depends on a number of feasible trajectories available for that vehicle to follow. For example, a probability of the vehicle to follow a trajectory changing a lane of motion of the vehicle depends on an availability of the trajectory making the vehicle to maintain its course in the current lane. To that end, some embodiments generate the feasible trajectories for different velocities of the hypothetical vehicles at different locations of the environment traveling with different driving intentions.

Some embodiments are based on understanding that the probability of the vehicle to follow the feasible trajectory depends on statistic of usage of this type of trajectories. For example, in general, the vehicles more often maintain their motion in a current lane of travel rather than change the lanes. Thus, when a vehicle travels the segment that belongs to both changing lane trajectory and maintaining current motion trajectory, it is more likely than the vehicle stays in its current lane.

To that end, some embodiment generates the feasible trajectory using different driving indentations of a driver of a hypothetical vehicle consistent with the current state of the hypothetical vehicle, and determines the probability of each feasible trajectory based on statistics on driving intentions represented by the feasible trajectories. For example, the statistics of usage of different types of trajectories can be determined based on historical data of the motion of the vehicles along different trajectories.

Some embodiments are based on recognition that the drivers of the vehicles can indicate their driving intentions either directly or indirectly. For example, a left turn signal can serve as a direct indication of the driver intention either to turn left or to switch the lanes to the left. Lack of such a signal is an indirect indication for lacking such intent.

However, some embodiments are based on realization that the current motion of the vehicle in combination to the current road traffic can also be used to estimate the driving intention of the driver of the vehicle. For example, if a vehicle accelerates closing a distance with a front vehicle, that acceleration can be an indication that the vehicle is about to change lanes. However, when there is a free space affront of the accelerating vehicle, the switching lane maneuverer is less likely. As another example, when the motion of the vehicle includes a sudden swirl, that swirl can be an indication that the driver checking a side mirror contemplating a maneuverer.

To that end, some embodiments classify the motion of the vehicle using road traffic in the environment to produce a driving intention of the vehicle and update the probabilities of the feasible trajectories based on consistency of the feasible trajectories with the produced intention of the vehicle. In different embodiments, the classification is performed using a trained neural network, a support vector machine, and/or a deep decision tree.

Accordingly, one embodiment discloses a method for controlling a host vehicle traveling in an environment shared with a set of vehicles, wherein the method uses a processor coupled with stored instructions implementing the method, wherein the instructions, when executed by the processor carry out at least some steps of the method. The method includes controlling a motion of the host vehicle in the environment according to a trajectory; determining a set of feasible trajectories of hypothetical vehicles traveling in a driving area of the host vehicle defined by a state of the motion of the host vehicle and a map of the environment; generating a time-series signal indicative of motion of each vehicle in the set of vehicles traveling in the environment; determining, using the trajectory of the host vehicle, a probability of each feasible trajectory to intersect with the trajectory of the host vehicle; determining, using the time-series signals, a probability of each feasible trajectory to be followed by at least one vehicle; determining a level of risk of each feasible trajectory as a combination of the probability of the feasible trajectory to intersect with the trajectory of the host vehicle and the probability of the feasible trajectory to be followed by at least one vehicle; and adjusting the trajectory of the host vehicle in response to assessing the levels of risk of the feasible trajectories.

Another embodiment discloses a control system of a host vehicle for controlling motion of the host vehicle traveling in an environment shared with a set of vehicles, including a controller to control a motion of the host vehicle in the environment according to a trajectory; at least one sensor to generate a time-series signal indicative of motion of each vehicle in the set of vehicles traveling in the environment; a threat assessor including a processor to determine a set of feasible trajectories of hypothetical vehicles traveling in a driving area of the host vehicle defined by a state of the motion of the host vehicle and a map of the environment, and to determine a level of risk of each feasible trajectory as a combination of a probability of the feasible trajectory to intersect with the trajectory of the host vehicle and a probability of the feasible trajectory to be followed by at least one vehicle; and a motion planner to adjust the trajectory of the host vehicle in response to assessing the levels of risk of the feasible trajectories.

Yet another embodiment discloses a non-transitory computer readable storage medium embodied thereon a program executable by a processor for performing a method. The method includes controlling a motion of the host vehicle in the environment according to a trajectory; determining a set of feasible trajectories of hypothetical vehicles traveling in a driving area of the host vehicle defined by a state of the motion of the host vehicle and a map of the environment; generating, using at least one sensor located on the host vehicle, a time-series signal indicative of motion of each vehicle in the set of vehicles traveling in the environment; determining, using the trajectory of the host vehicle, a probability of each feasible trajectory to intersect with the trajectory of the host vehicle; determining, using the time-series signals, a probability of each feasible trajectory to be followed by at least one vehicle; determining a level of risk of each feasible trajectory as a combination of the probability of the feasible trajectory to intersect with the trajectory of the host vehicle and the probability of the feasible trajectory to be followed by at least one vehicle; and adjusting the trajectory of the host vehicle in response to assessing the levels of risk of the feasible trajectories.

BRIEF DESCRIPTION OF THE DRAWING

FIG. 2D shows a set of different driving intentions used by some embodiments.

FIG. 4C and FIG. 4D show examples of comparing trajectories according to several embodiments.

FIG. 8A shows an example of a set of driving intentions considered by one embodiment.

DETAILED DESCRIPTION

Figure 1A:
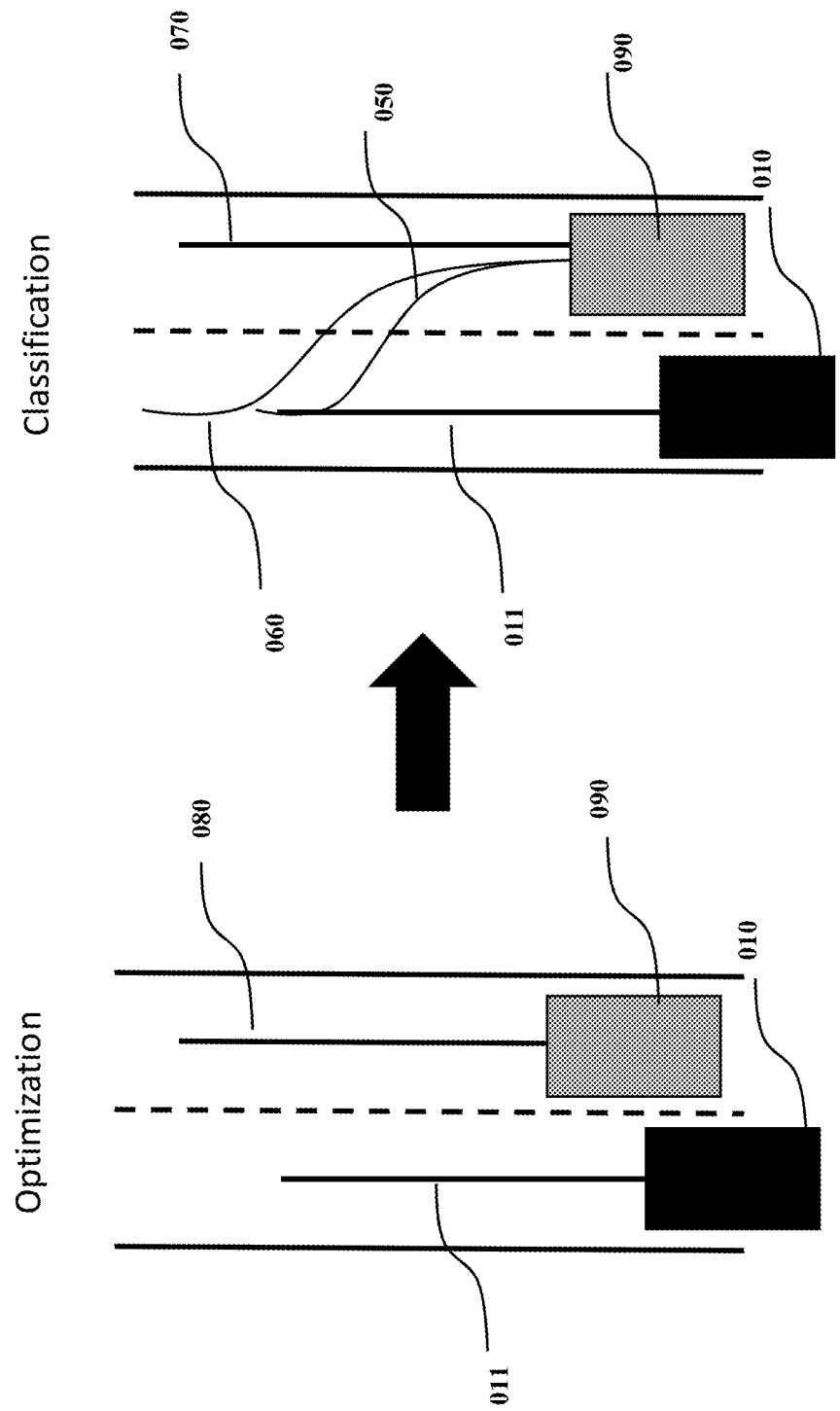
FIG. 1A shows a schematic illustrating several principles employed by some embodiments.

FIG. 1A shows a schematic illustrating several principles employed by some embodiments. Consider an example of FIG. 1A, in which a vehicle 010, hereafter denoted as the host vehicle, travels in the left lane on a two-lane road. The vehicle can be a manually-driven vehicle, an autonomous vehicle, or a vehicle driven in automatic mode. The host vehicle 010 intends to maintain a steady course 011 in the left lane. The host vehicle 010 shares the road with another vehicle 090 that travels in the right lane of the road. The position and velocity at the current time can be measured, for example, by sensors attached to the host vehicle such as camera or radar, or by global positioning system (GPS), or vehicle to vehicle communication. However, the future position and velocity of the other vehicle 090 is unknown at the current time. Thus, to find out whether the other vehicle 090 is a threat to the host vehicle 010, the future motion of 090 needs to be determined.

Threat assessment can be used to warn a driver of the vehicle of incoming risks or in case of autonomous driving adjust the trajectory determined in previous iterations. When the host vehicle navigates in a shared environment, it needs to be attentive to vehicles in front and behind, vehicles to the right and to the left, and needs to make decisions in which lane to travel. Thus, a threat assessment that calculates where other vehicles will be in the forthcoming seconds, and thus also calculates the risk of collision with the host vehicle A possible way to predict the motion of other vehicles is to assume that the other vehicle 090 wants to optimize its ride, for example, with respect to minimizing the risk of collision. Consequently, in FIG. 1A a future motion of the other vehicle that minimizes the risk of collision is a motion 080 that stays in the right lane, assuming that this is also what the host vehicle 010 will do. With this approach, there is in FIG. 1A no threat to the host vehicle 010 along its intended motion.

However, this assumption that the other vehicle wants to minimize risk might not be true. Furthermore, when there are many other vehicles in the close vicinity of the host vehicle 010, optimizing for all vehicles become a daunting task. Another possibility is to generate, either online or a priori, a set of possible motions 050, 060, and 070, that a vehicle could perform. Then, to assess the threat of the other vehicle 090 to the host vehicle 010, amounts to investigating whether the other vehicle 090 is likely to travel along, or close to, the generated motions. By doing in such a way, the problem of assessing a threat of another vehicle is transformed from that of optimizing trajectories, that might not be possible in real time, to assigning the other vehicle 090 to any of the trajectories 050, 060, 070. That is, optimization task is replaced by assigning, or classification, task. Notable, the number of optimizations grows with the number of obstacles, i.e., other vehicles traveling in the environment shared with the host vehicle, and the computational complexity grows even faster. On the other hand, in assignments there is a finite set of generated trajectories, which does not grow in complexity faster than the number of other vehicles. To that end, it is an object of some embodiments to provide a system and a method for controlling a vehicle in a shared environment with a set of other vehicles that are classified and assigned to generated trajectories.

Consequently, some embodiments are based on recognition that vehicles traveling in the environment shared with the host vehicle pose a threat to the host vehicle only when the vehicles are moving along the trajectories intersecting the trajectory of the host vehicle. This statement, however, can be reversed leading to the understanding that a hypothetical trajectory that intersects with the trajectory of the host vehicle poses a threat to the host vehicle only if there is another vehicle that travels along that hypothetical trajectory.

Figure 1B:
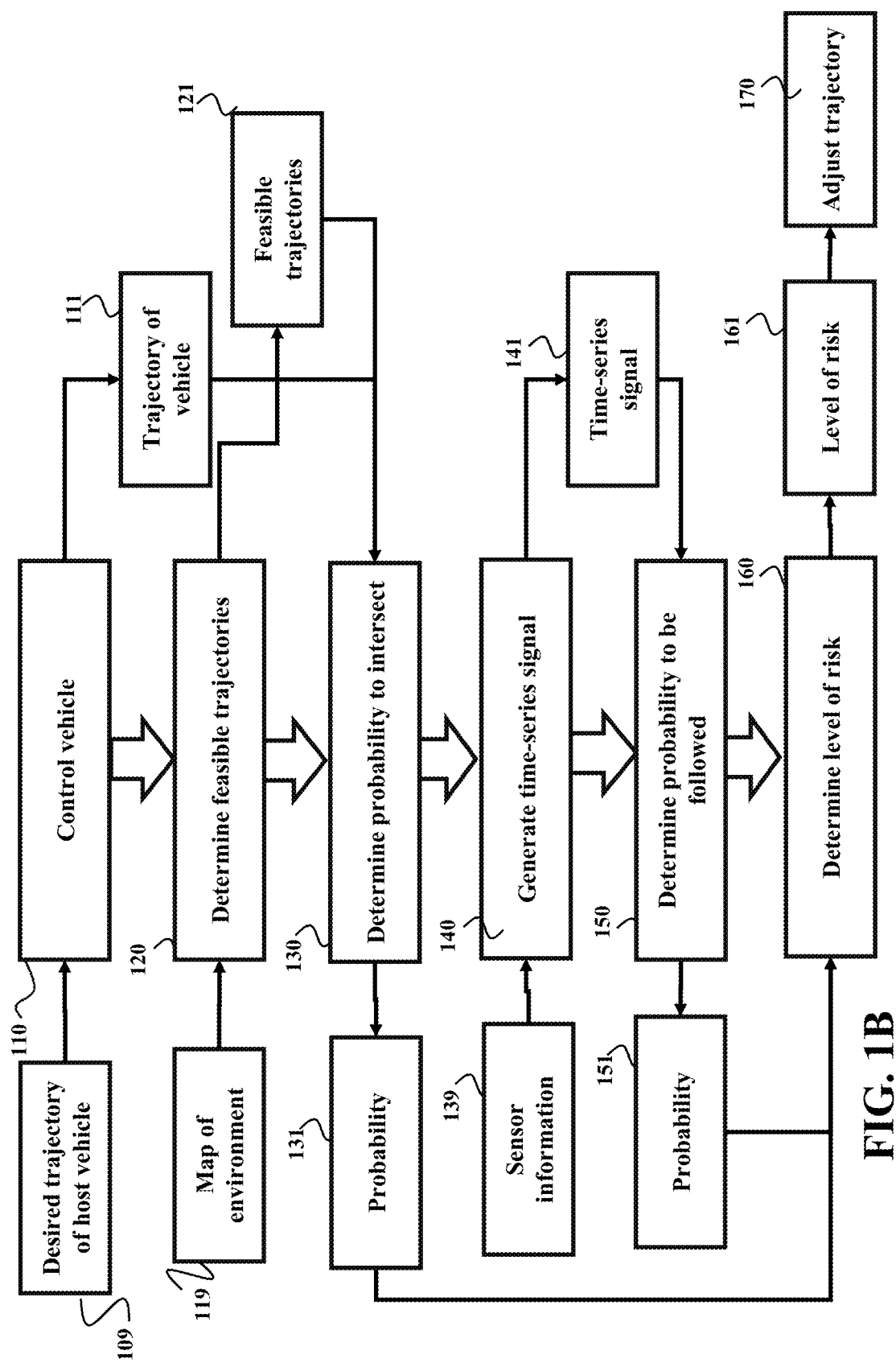
FIG. 1B shows a flowchart of a method for controlling a host vehicle traveling in an environment shared with a set of vehicles according to some embodiments.

FIG. 1B shows a flowchart of a method for controlling a host vehicle traveling in an environment shared with a set of vehicles, hereafter denoted with other vehicles according to some embodiments. The method uses a processor coupled with stored instructions implementing the method, wherein the instructions, when executed by the processor carry out at least some steps of the method. The method 110 controls the motion of the host vehicle in the environment according to a previously determined desired trajectory 109. The controlling 110 produces a trajectory 111 of the host vehicle that corresponds to the desired trajectory 109 of the host vehicle. In some instances, trajectories 109 and 111 can be the same, but because of modeling and sensing errors, and errors in the numerical precision in representing the trajectory, the trajectories 109 and 111 may deviate.

Then, the method determines 120 a set of feasible trajectories of hypothetical vehicles traveling in a driving area of the host vehicle, to generate a set of trajectories 121 that satisfy constraints on the motion of a real vehicle, for example, constraints due to the mechanical configuration of a vehicle or due to road boundaries and other physically justified constraints. For instance, limited steering actuation that can be used in a real vehicle can add constraints on the feasible trajectories. Next, the method uses the trajectory of the vehicle 111 to determine 130 a probability of each of the feasible trajectories to intersect with the future trajectory of the host vehicle. The method generates 140, using at least one sensor 139 attached to the host vehicle, a time-series signal indicative of the motion of the vehicles traveling in the environment. The measurements can include camera measurements or laser/LIDAR measurements from the host vehicle. The measurements can include measurements from vehicle to vehicle communication, and the measurements can include GPS data. The length of the measurement sequence can be the same for all vehicle or can vary from vehicle to vehicle. Using the time-series signal 141 from the determining 140, the method determines 150 a probability of each of the feasible trajectories to be followed by at least one of the host vehicles. Then, using the determined probability 131 to intersect and the probability 151 of at least one of the hypothetical trajectories to be followed by at least one of the vehicles indicated by the time-series signal 141, the method determines 160 a level of risk of each feasible trajectory as a combination of the probability of the feasible trajectory to intersect with the trajectory of the host vehicle and the probability of the feasible trajectory to be followed by at least one vehicle. Finally, the method uses the level of risk 161 to adjust the trajectory 170 of the vehicle to decrease, or completely remove, the level of risk.

Figure 2A:
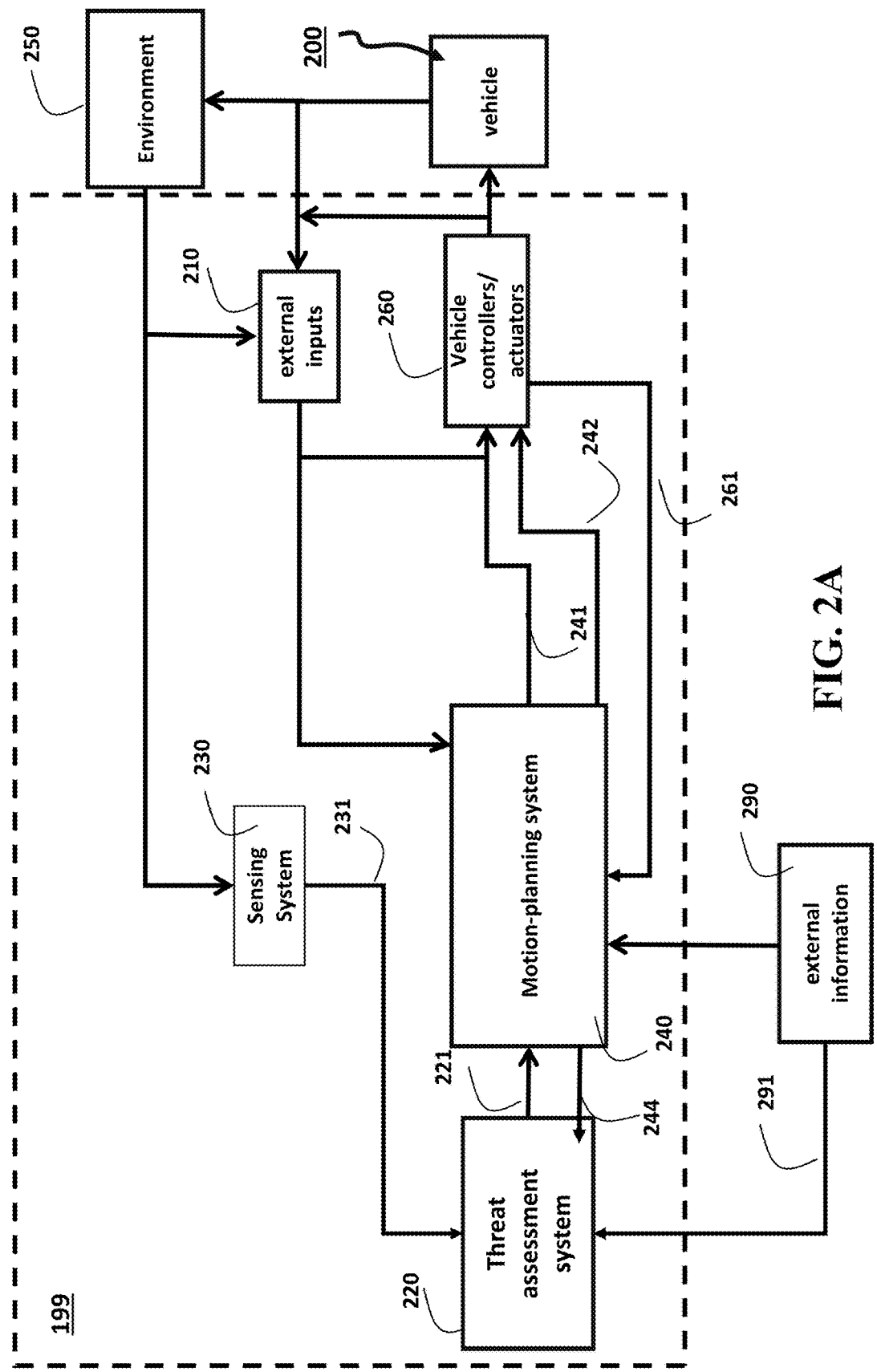
FIG. 2A shows a block diagram of a control system for controlling a host vehicle according to some embodiments.

The set of trajectories can include a multiple of different trajectories. For instance, one feasible trajectory can be aligned with the middle of the right lane, one may be aligned with the left lane, and one may change from the right to the left lane. The trajectory includes a state, such as position and heading, and the time evolution of the position and heading, defined with respect to the state of the motion of the host vehicle FIG. 2A shows a block diagram of a control system 199 for controlling a host vehicle 200 according to some embodiments. The vehicle can be any type of moving vehicle equipped with an autonomous system, such as a four-wheeled passenger car or a mobile robot. The vehicle can also receive external inputs 210 overriding the commands of the control system 199. In such a case the vehicle is a semi-autonomous vehicle.

The control system 199 includes a motion-planning system 240 for determining the control input and/or a sequence of control inputs corresponding to the future motion of the vehicle. For example, an initial state can be the current location as determined by the GPS, or as a combination of the current location and the current velocity, determined by combinations of GPS and IMU, and the objective of the motion-planning system 240 is to determine a future motion of the vehicle that reaches a target state while avoiding collision and fulfilling certain constraints on the motion of the vehicle. The target state can be determined internally or be received from an external module 290. The target state can also be determined in response to information 224 from a threat assessor 220, assessing threat 221 of the motion of obstacles, obtained from sensing information 231 from a sensing system 230, including at least one sensor for generating a time-series signal indicative of motion of each vehicle in the set of vehicles traveling in the environment. For example, the target location can be a location avoiding a collision with the obstacle.

The control system 199 includes a threat assessor 220 for determining safe regions of the vehicle to travel in by asserting the level of risk for collision with the vehicles detected by the sensing system 230. For example, the threat assessor 220 can receive information 231 from a sensing system 230 including global positioning system (GPS) information and/or an inertial measurement unit (IMU). For example, the IMU can comprise 3-axis accelerometer(s), 3-axis gyroscope(s), and/or magnetometer(s). The IMU can provide acceleration, velocity, orientation, and/or other position related information to other components of the control system 199.

In addition to the sensing information 231, the threat assessor 240 can receive information 291 about the surroundings 250, such as static obstacles, drivable, non-drivable, or illegal areas, for the vehicle. This information can then be used to restrict the different hypothetical trajectories. The information 291 can also be received from the sensors 230, or as external information 290, for example, using vehicle-to-vehicle, or vehicle-to-infrastructure communication, or from a database that contains information about the road network. The information about the environment can be represented as a map. The threat assessor 240 receives information 244 about the future trajectory computed by the motion-planning system 240. This information can include a state of the host vehicle, such as position, heading, velocity, and is received either from hardware or software, connected directly or remotely to the machine.

The threat assessor 220 predicts the motion and also a measure of risk 221 for the other obstacles, such as vehicles and pedestrians, to collide or come sufficiently close to the host vehicle. The motion at least includes a path, velocity, and orientation/heading, but can also include further entities, such as rotational velocities, accelerations, and steering. In addition, the motion can be represented as a probability density function (PDF) that measures the probability that the motion is at a certain place in a certain time. In response to this, the motion-planning system 240 takes the threat measure and/or the predicted motions 221 into account when it determines the future motion 241 of the host vehicle.

In one embodiment, the threat assessor determines a set of feasible trajectories of hypothetical vehicles traveling in a driving area of the host vehicle defined relative to the state of the motion of the host vehicle and related to the map of the environment. In another embodiment, the threat assessor determines a level of risk of each feasible trajectory as a combination of a probability of the feasible trajectory to intersect with the trajectory of the host vehicle and a probability of the feasible trajectory to be followed by at least one vehicle.

Figure 2B:
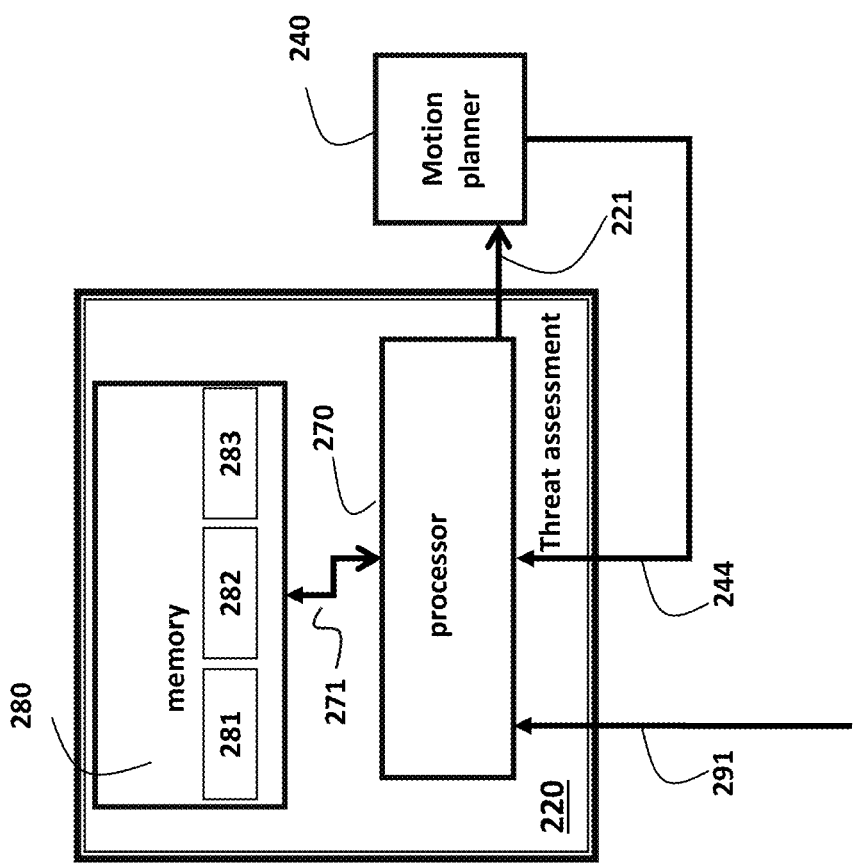
FIG. 2B shows a general structure of the threat assessor according to one embodiment.

FIG. 2B shows a general structure of the threat assessor 220 according to one embodiment. The threat assessor 220 includes at least one processor 270 for executing modules of the threat assessor 220. The processor 270 is connected 271 to a memory 280 that stores the map 281 of the environment and the vehicle information 282. The memory 280 also stores 283 the hypothetical trajectories up to the current time or at least a rich enough database of a subset of the hypothetical trajectories, including, but not limited to, values of each computed state, the motion leading up to each state. In addition, the memory stores with the vehicle information 282 a model of the motion of a hypothetical vehicle, such as a kinematic model that satisfy the mechanical design of a typical vehicle, and the memory stores a set of driving intentions representative of the intentions a driver can make. For instance, the set of intentions can include one or combination of a turn left intention, a turn right intention, a drive straight intention, a change lane left intention, a change lane right intention, a brake intention, an accelerate intention, and a maintain velocity intention One embodiment relies on understanding that although there is an infinite number of trajectories a vehicle could take, there is only a finite set of high-level actions; drive straight, change lane left, change lane right, et cetera, and although these actions lead to infinitely many trajectories, decisions leading to different trajectories can be grouped in terms of their similarity. Thus, in one embodiment, the threat assessor uses a finite set of predetermined trajectories that are representative of the infinitely many trajectories. This can be particularly valuable when there are many obstacles in the region of interest of the host vehicle, in which the computational demands would be overwhelming if trying to exactly capture all different hypothetical trajectories. An obstacle can be another vehicle or a pedestrian, or a virtual obstacle representing illegal driving behavior, such as the line delimiting the allowed driving lane, a stop line, a yield sign, or from inputs from a driver or passenger.

Figure 2C:
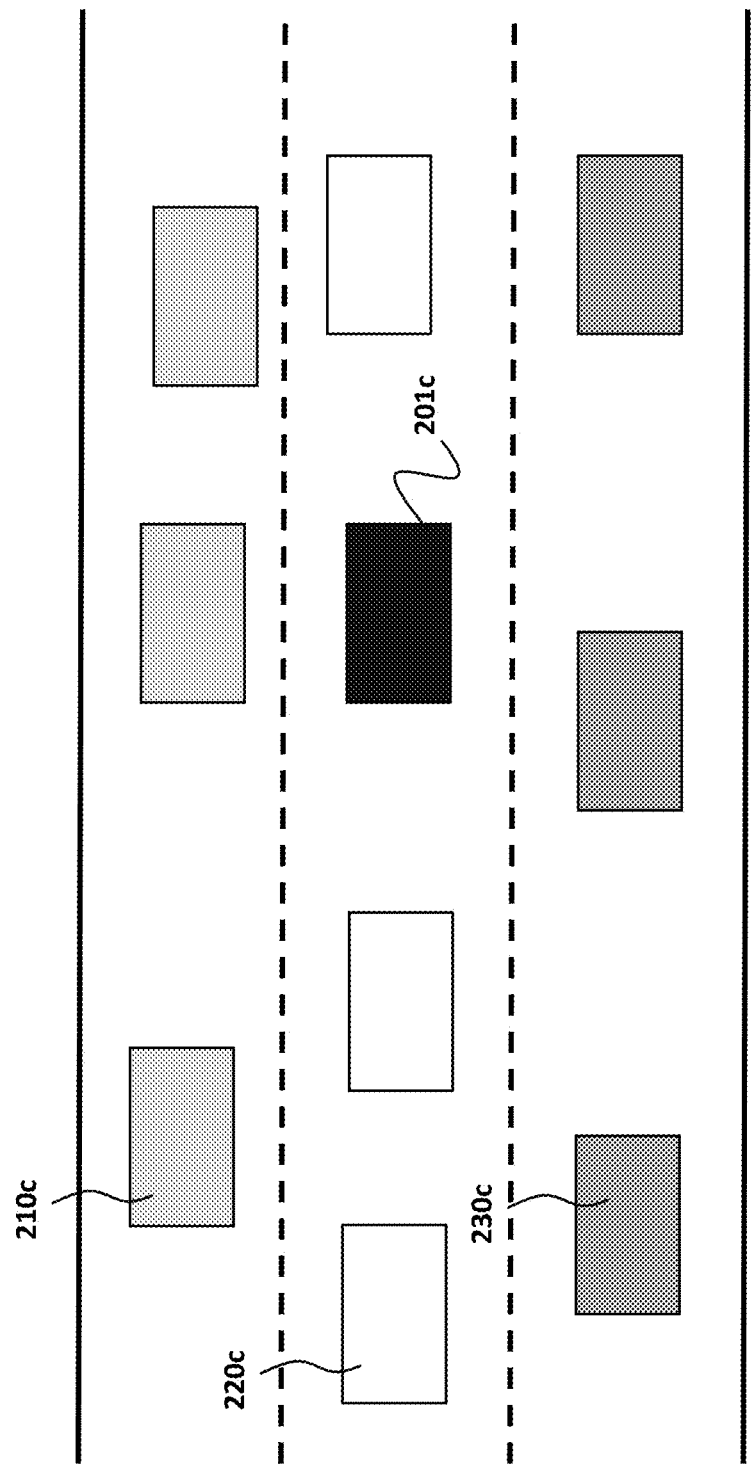
FIG. 2C shows an example of motion of the host vehicle.

FIG. 2C shows an example when the host vehicle 201*b* drives in a three-lane road and is surrounded by a multiple of other vehicles in the same lane 220*b*, in the left lane 210*b*, and in the right lane 230*b*. If the motions of all detected obstacles are to be predicted with high precision, the computational cost of this example is overwhelming, since there are limited computational resources available. To that end, some embodiments assign vehicles to a subset of hypothetical trajectories with accuracy similar or close the accuracy of the prediction approach.

The hypothetical trajectories of the obstacles are searched for intersection with the computed trajectory of the host vehicle such that a collision can occur, and one embodiment assigns a high probability of collision to those motions that are predicted to collide with the host vehicle. In one embodiment, the hypothetical trajectories are generated using a kinematic model of the motion of a vehicle, where different velocities will cause a slightly different trajectory, and where different driving intentions, selected from a set of driving intentions.

FIG. 2D shows a possible set of different driving intentions. By combining different combinations of driving intentions, slightly different trajectories are obtained. For instance, combining turning left 210*d* with accelerating 270*d* will cause a turn to the left where the vehicle slows down, whereas combining turning left 210*d* with maintaining velocity 280*d* will also cause a turn to the left lane but with a different path to reach the left lane. However, there is a finite set of driving intentions, which means that the resulting trajectories can also be encapsulated into a finite set of trajectories.

In one embodiment described later, the infinite number of trajectories is encapsulated into a finite set of trajectories by assigning a probability distribution function to one trajectory resulting from one unique combination of intentions. Depending on the location with which the trajectory is initiated, that is, from which position a hypothetical vehicle is on the toad, the hypothetical different trajectories are more or less likely to be trajectories followed by a vehicle observed by the sensing system. Consequently, one embodiment generates the feasible trajectories starting from different locations with respect to the host vehicle, wherein the different locations are dependent on the information provided by the map. For instance, if there is an obstruction in the right lane and the host vehicle is located in the left lane, hypothetical trajectories emanating from locations in front of the host vehicle are more likely to change lane and accelerate, whereas if the position is behind the host vehicle, hypothetical trajectories are more likely to slow down.

The motion 241 is used as an input, or reference trajectory, to the vehicle controllers 260 to compute vehicle commands, such as steering, brake, and throttle. Those commands are submitted to the actuators of the vehicle to move the vehicle according to the predicted motion 241. If the motion model of the vehicle contained in the motion planner 240 uses the same control inputs as the actual vehicle, the vehicle can be controlled directly using the computed inputs. For example, if the vehicle 200 is controlled by applying steering and engine torque, and if the motion model used in the motion planner also uses steering and engine torque as control inputs, these can be applied directly to the vehicle, thereby overriding the vehicle-control system 260. However, because the mathematical description of the vehicle 200 used in the motion planner 240 can be a simplification of the true motion of the vehicle, the control inputs 242 can instead be used as feedforward, or nominal, control signals together with motion references 241 as inputs to the vehicle-control system 260. For example, accelerations can be modeled to be proportional to the engine torque. Hence, if accelerations are used as inputs in the motion model of the vehicle employed in the motion-planning system 240, the accelerations can be used as scaled feedforward inputs to the vehicle-control system 260.

Referring back to 283 in FIG. 2B and 120 in FIG. 1B, a database containing stored hypothetical trajectories of other vehicles relative to the host vehicle can be maintained. For instance, hypothetical trajectories can be generated a priori and then be considered through a look-up table. One embodiment uses the database to compare previously stored trajectories with the trajectories that are currently being measured by the sensing system 230 in FIG. 2A and which can generate the time-series signals 141 in FIG. 1B. If any of the stored hypothetical trajectories are similar, in a sense to be defined in the invention, to the currently measured vehicle, the stored trajectory gives information about what the future motion of the currently measured vehicle will be. The main benefit with such a similarity check is that, referring back to FIG. 2C, if there are numerous vehicles in the region of interest of the host vehicle, the computational demands in predicting the motion of all vehicles are overwhelming.

Figure 3A:
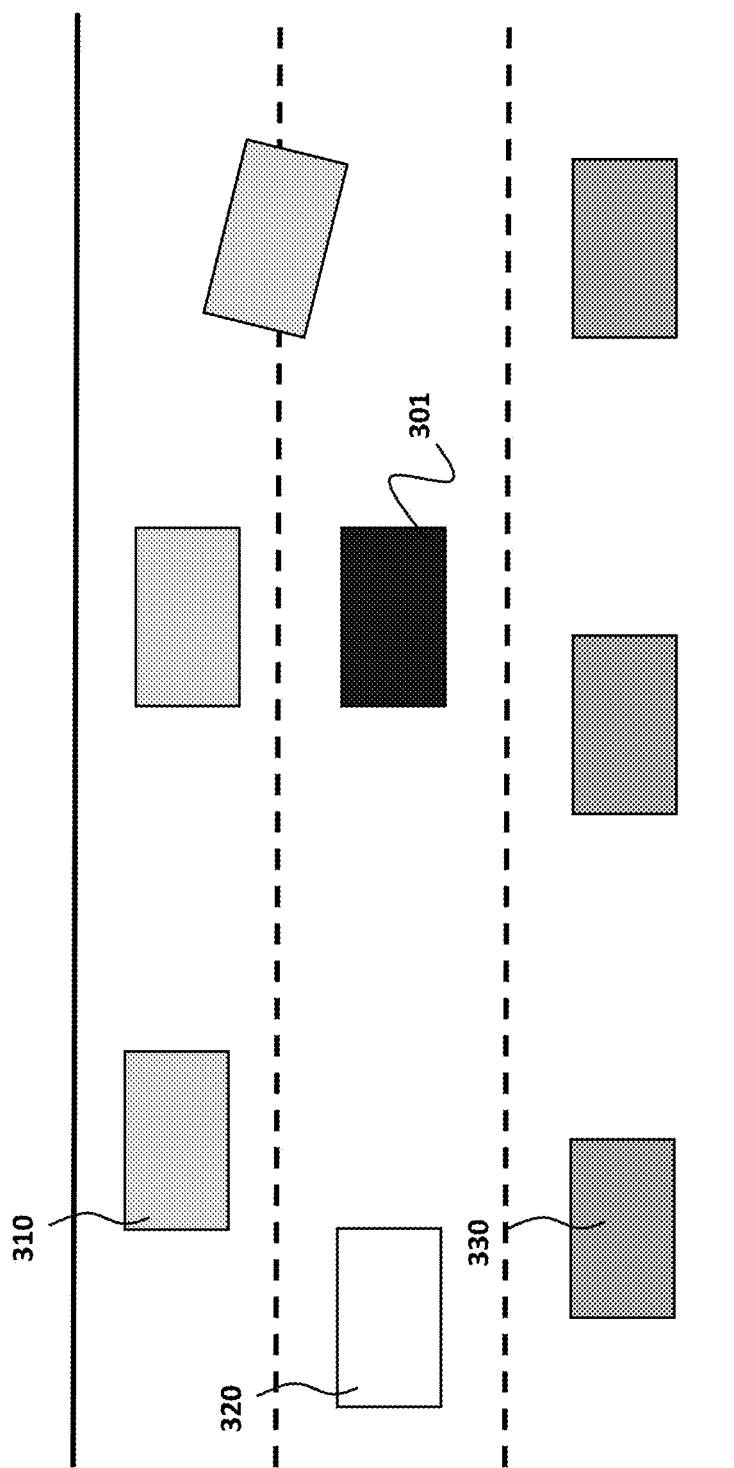
FIG. 3A shows an example of the motion of the host vehicle in the environment shared with other vehicles.

FIG. 3A shows an example of the motion of the host vehicle 301 surrounded by vehicles 310 in the left lane, by a vehicle 320 in the same lane, and by vehicles 330 in the right lane, i.e., seven vehicles in total. This amounts to predictions of the motion of seven vehicles for a period of time. However, the generation of the feasible trajectories makes an effect of clustering the vehicles together thereby reducing the computational burden.

Figure 3B:
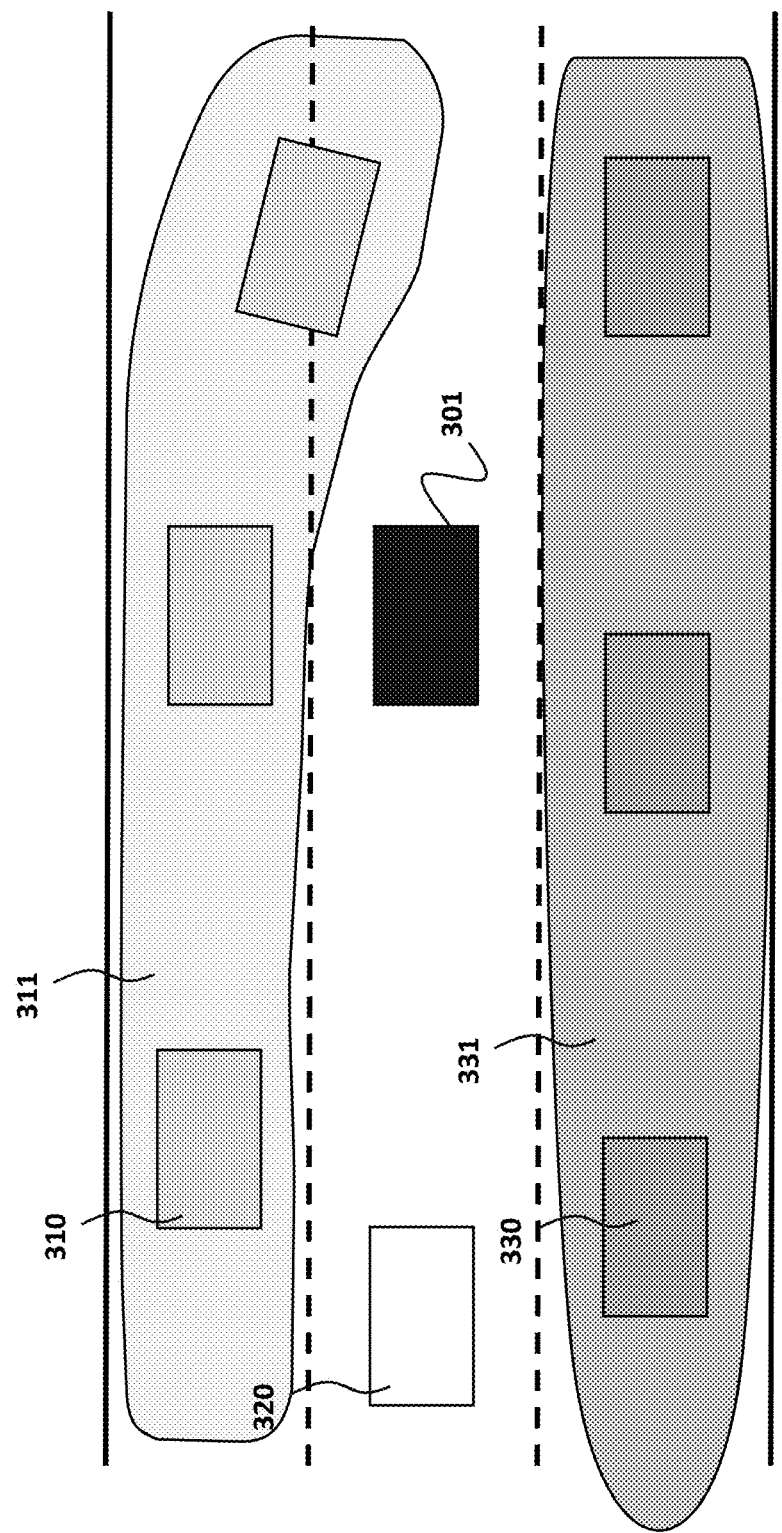
FIG. 3B and FIG. 3C show examples of grouping the motion of the vehicles in FIG. 3A according to different embodiments.

FIG. 3B shows an example where vehicles 310 are considered similar to each other, indicated by the region 311, according to some embodiments. Similarly, vehicles 330 are also considered similar, indicated by region 331. Hence, there are now 3 vehicle behaviors instead of 7, effectively decreasing the computational demands in predicting the motion of the surrounding vehicles.

Figure 3C:
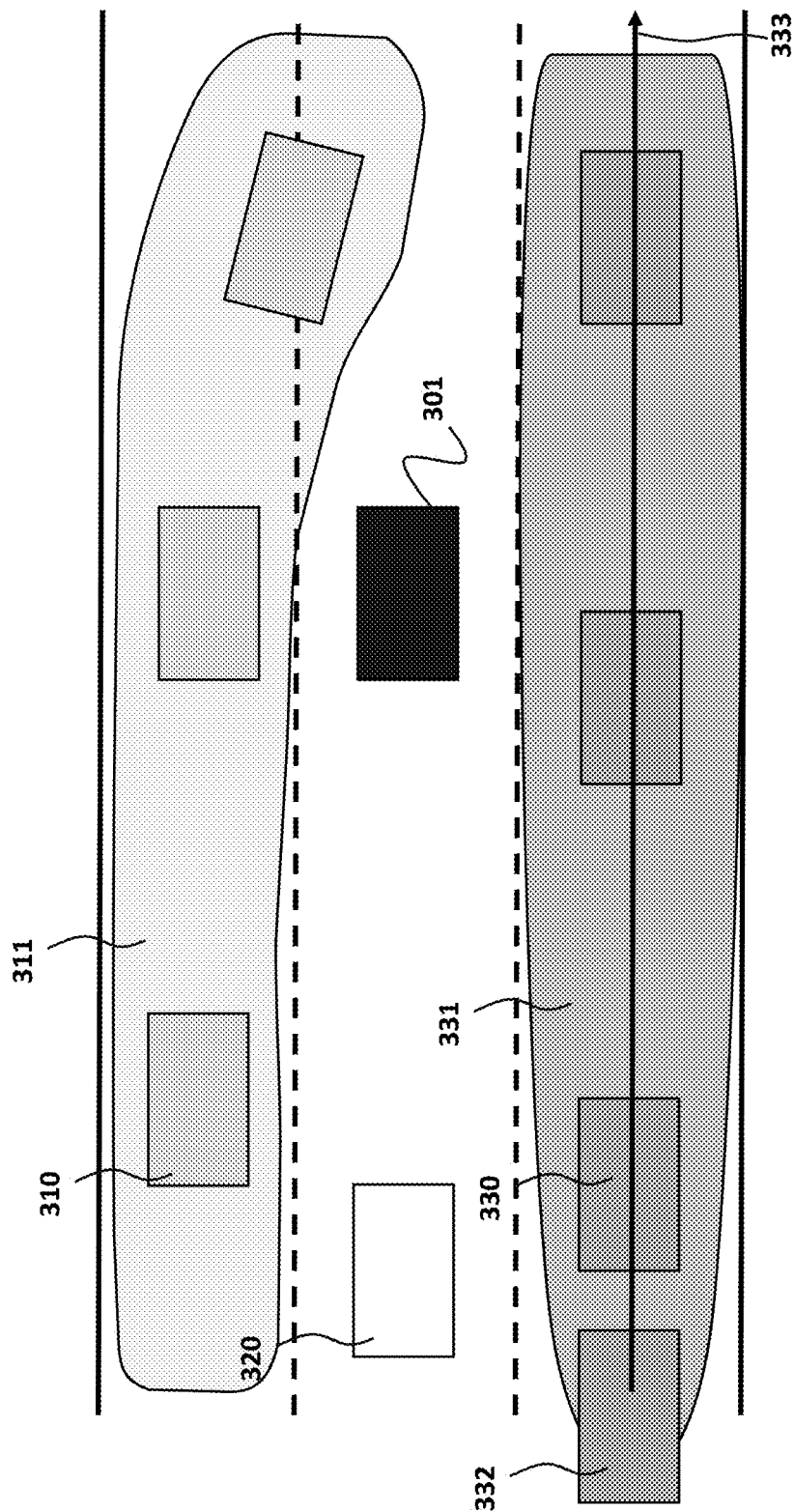

Furthermore, consider FIG. 3C in which a new vehicle 332 enters the region of interest. It is deemed that the vehicle 332 is similar to vehicles 330, so vehicle 332 also belongs to region 331. The region vehicles 330 in 331 moves according to 333, in which trajectory 333 is a representative of the vehicles belonging to the region 331. Accordingly, in one embodiment, prediction of vehicle 332 is a matter of extracting the feasible trajectory 333 in the memory 283.

In one embodiment, the feasible trajectories are generated from previously determined time-series signals. For instance, the time-series signal 141 is after generation stored in a memory and then assigned to be a feasible trajectory of a hypothetical vehicle. In further embodiments, to keep the memory size low, feasible trajectories that have not been deemed to be likely to be followed by a measured vehicle for a long period of time, is deleted from the memory. Thus, feasible trajectories that are improbable to be followed by a vehicle do not need to reserve memory. In one embodiment, a measured vehicle is assigned to a subset of feasible trajectories consistent with the time-series signal of the measured vehicle within some tolerance.

Figure 4A:
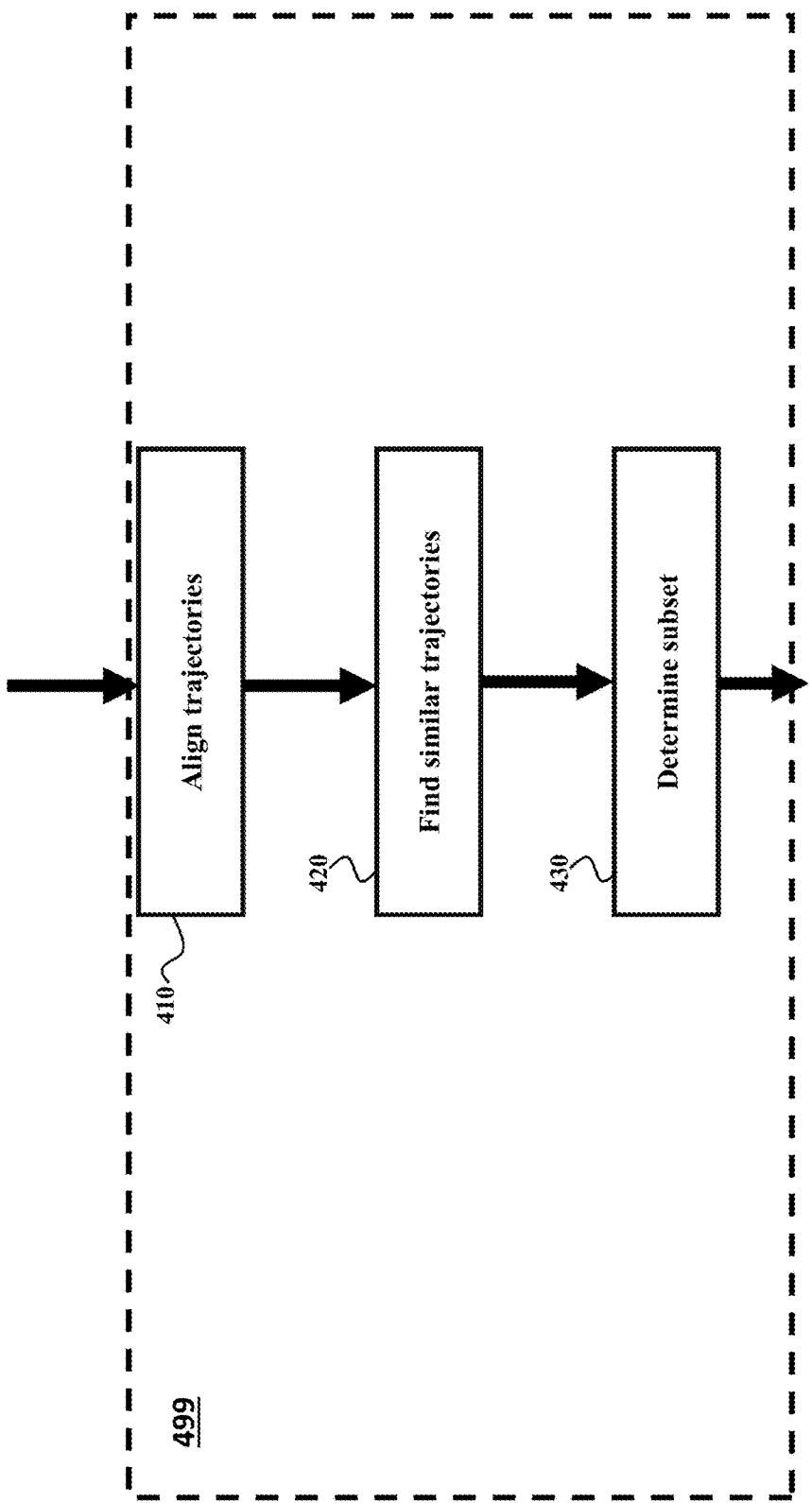
FIG. 4A shows a flowchart of an exemplar implementation of a method for assigning a vehicle to a subset of feasible trajectories according to some embodiments.

FIG. 4A shows a flowchart of an exemplar implementation of a method 499 for assigning a measured vehicle with a subset of feasible trajectories according to some embodiments. The assigning aligns 410 the incoming trajectory with the hypothetical trajectories, to produce two trajectories that can be compared. In some embodiments of the invention, the alignment is done by normalizing the time component.

Figure 4B:
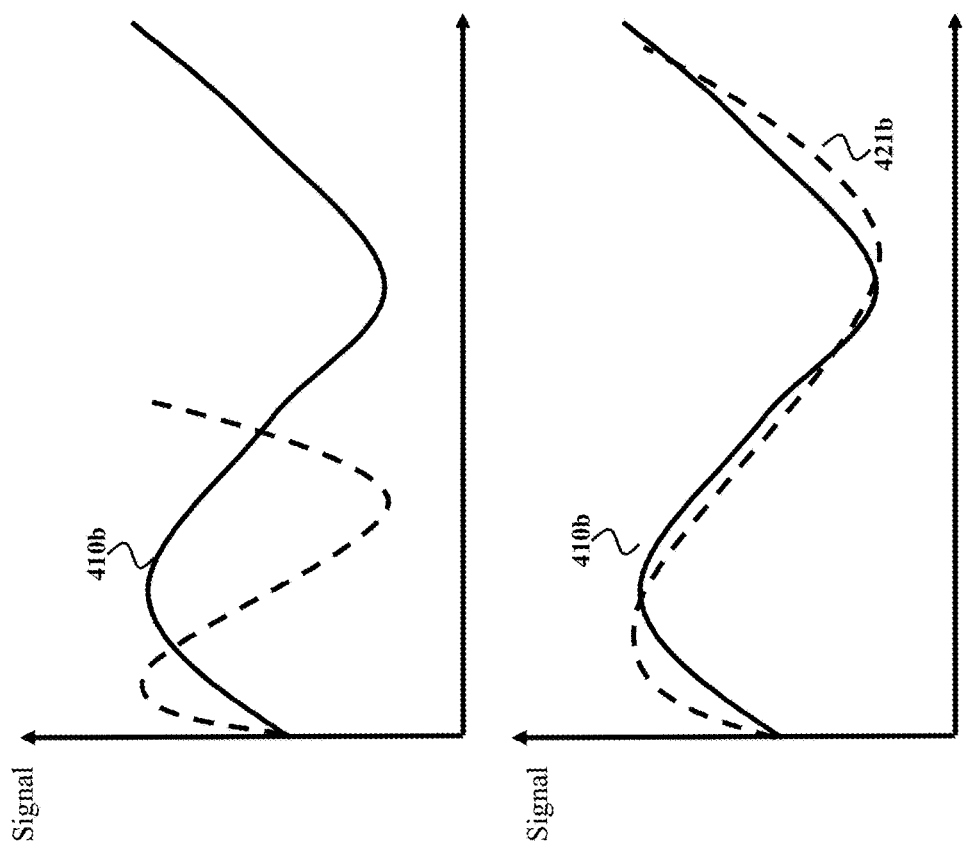
FIG. 4B shows a schematic of aligning trajectories by normalizing the time component according to some embodiments.

FIG. 4B shows a schematic of aligning trajectories by normalizing the time component according to some embodiments. As illustrated in FIG. 4B, normalizing the time component can be interpreted as stretching out trajectory 420b to 421b in order to match with 410b in the best possible way. For example, if the vertical axis in FIG. 4B is lateral position of a vehicle and the horizontal axis is the longitudinal position, FIG. 4B can be interpreted as stretching out the longitudinal position to match with 410b. In such a case, the similarity between trajectory 410b and 420b will be high, even though the path point by point is not similar. By adding the dimension of time to FIG. 4B, the time can be stretched to fit the path, in which case similarities between actual driving on, e.g., a road can be evaluated.

Then, the method 420 determines what feasible trajectories are similar to the currently measured trajectory. This can be done in a number of ways. For example, in one embodiment two trajectories are considered similar if the difference, as measured by the previously defined distance measure, is below a threshold.

FIG. 4C and FIG. 4D shows examples of comparing trajectories where the threshold 420c is fixed to a value according to some embodiments. This value can be set a priori or determined in real-time depending on which metric is used and external effects. For example, if the scenario is highway driving, where the velocities in general are high, one embodiment sets the threshold differently than a threshold for the urban driving. FIG. 4C also shows the minimum distances 410c, 430c, and 440c for 3 trajectories, 410d, 430d, and 440d, shown in FIG. 4D. In this case, the considered distance metric gives that 410c and 430c are below the threshold 420c, meaning that the incoming trajectory 450d. The length of the trajectory to consider can vary. It can be set as fixed or made adaptive, in a receding horizon fashion. Then, the method 430 determines the level of similarity of the incoming trajectory 440d to the trajectories 410d and 430d. The method 430 calculates how much of the trajectory in the database the incoming trajectory is similar to.

One embodiment compares the time-series signal $U=[u_1, \ldots, u_i, \ldots, u_m]$ with a feasible trajectory $V=[v_1, \ldots, v_j, \ldots, v_n]$ by finding the minimum-time cost path $W=\{w_1, \ldots, w_k, \ldots w_l\}$, where $w_k=(i_k,j_k)$ and each pair $(i,j) \varepsilon W$ indicates that $u_i$ and $v_j$ are aligned. The warping function W minimizes the total distance between the two trajectories, defined as $$D_{U,V} \triangleq \sum_{k=1}^{l} d_{U,V}(i_k, j_k),$$

where $d_{U,V}(i_k,j_k)$ is a distance measure between $u(i_k)$ and $v(j_k)$. The distance measure can be any out of several. For example, it can be the Euclidean distance metric, or it can be any other metric or a distance measure that does not formally qualify as a metric. As an example, the minimum cost can be computed by the dynamic programming principle $D(i,j)=d(i,j)+\min D$, where $D(i,j)$ is the cost of the minimum path from (1,1) to (i,j), with $D(1,1)=d(1,1)$, and $\min D=\min (D(i,j-1), D(i-1, j), D(i-1, j-1))$. As the currently measured or estimated vehicle trajectory is updated from time to time, the minimum cost can be found recursively, that is, the minimum cost is appended with the new minimum cost between the hypothetical trajectory and the new time instant of the incoming trajectory. One possibility is to define similarity as $\text{support}(U_{i-1},U_i)=|U_{i-1}|/|U_i|$, where $|\cdot|$ is the cardinality and i is the index of the current time. If the output of this support function is less than a threshold, the method 420 is repeated with the full database. Finally, the set of trajectories, in FIGS. 4C and 4D 410d and 430d, are outputted from 430.

One embodiment determines the probability of the vehicle to follow each feasible trajectories from the subset based on statistics on driving intentions represented by the feasible trajectories. For instance, if the determining 499 produces a subset of trajectories where 3 have the intention of changing lane left and 1 of driving straight, the probability of changing lane left is 0.75. In another embodiment, the recorded history of intentions of vehicles in the past is generated to weight the probabilities of the trajectories to be followed. For instance, if 10 vehicles have been observed in the past, out of which 8 changed lane when in a similar position as the current measured vehicle, the probability of following either of the 3 change-lane feasible trajectories is 0.8.

If there are more than one trajectory in the subset of feasible trajectories that are similar to the trajectory of the measured vehicle are more than one, there is a possibility that either of these trajectories can be the one the vehicle will follow. Thus, if there are more than one similar trajectory in the subset, all of these trajectories can be possible future trajectories of the currently measured vehicle.

Figure 5A:
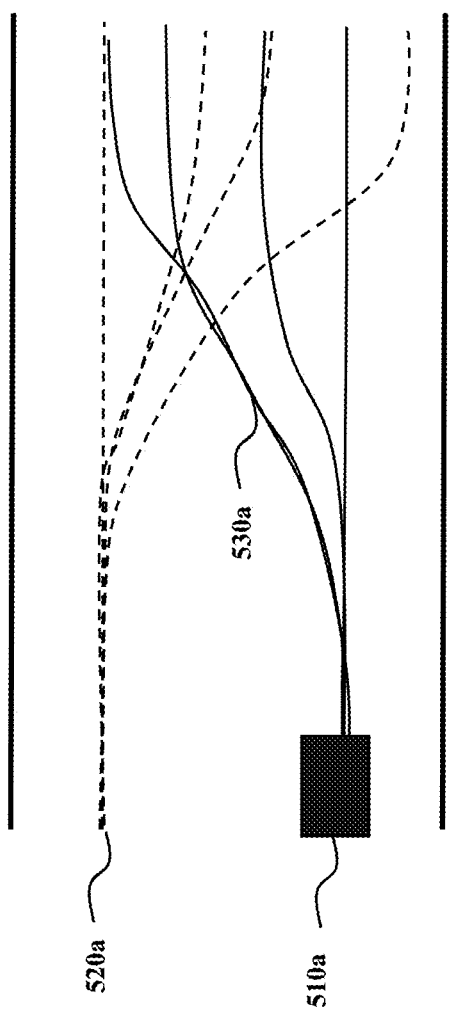
FIG. 5A shows examples of different trajectories stored in the database according to one embodiment.

FIG. 5A shows examples of different trajectories, such as trajectories 520a and 530a, 8 in total, stored in the database according to one embodiment. When a vehicle 510a enters into the scene, because the vehicle 510a drives in the right lane, in one implementation, the trajectories 520a are excluded in the similarity calculation, and thus, in this example, the subset of feasible trajectories includes four trajectories 530a.

Figure 5B:
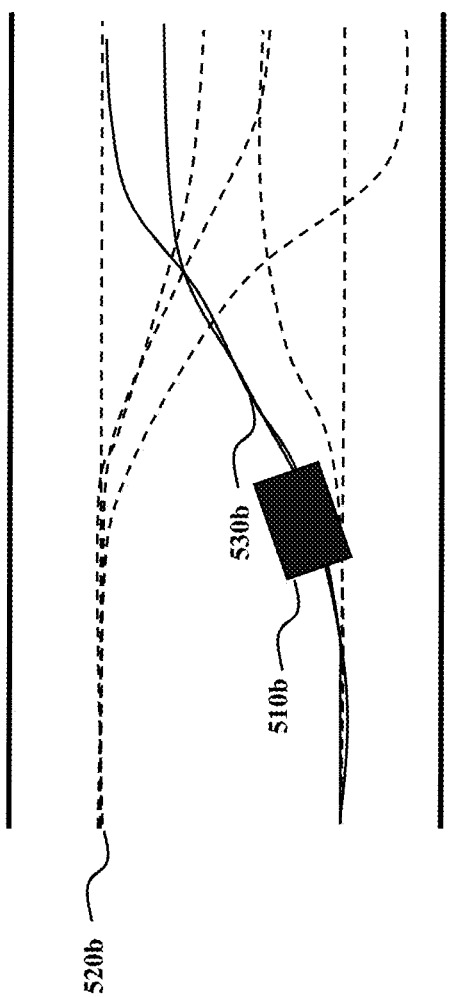
FIG. 5B and FIG. 5C show motion according to a scenario of FIG. 5A at different points of time.

FIG. 5B shows the same scenario as in FIG. 5A, but at a later point in time. Now the vehicle 510b has started to turn to the left. Only two other trajectories 530b also does this, which means that of the 4 trajectories in the subset of feasible trajectories, only 2 have a nonzero probability to be a trajectory the vehicle will follow. Thus, 6 trajectories 520b are excluded from the initial 8.

Figure 5C:
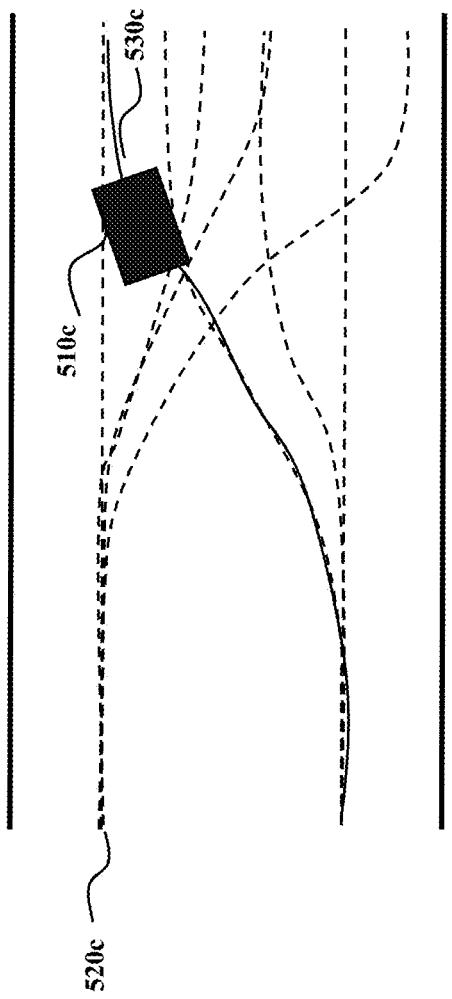

FIG. 5C shows the same scenario at the latest time instant. Now, there is only one trajectory 530c that is similar to the incoming vehicle 510c motion, which excludes the remaining 7 trajectories 520c.

In some embodiments, a trajectory refers to a path with time, including velocity and heading, but also includes the probability distribution of the trajectory. That is, as long as a vehicle remains within a probability density of possible states of the vehicle associated with the feasible trajectory, the vehicle can belong to this feasible trajectory.

Figure 5D:
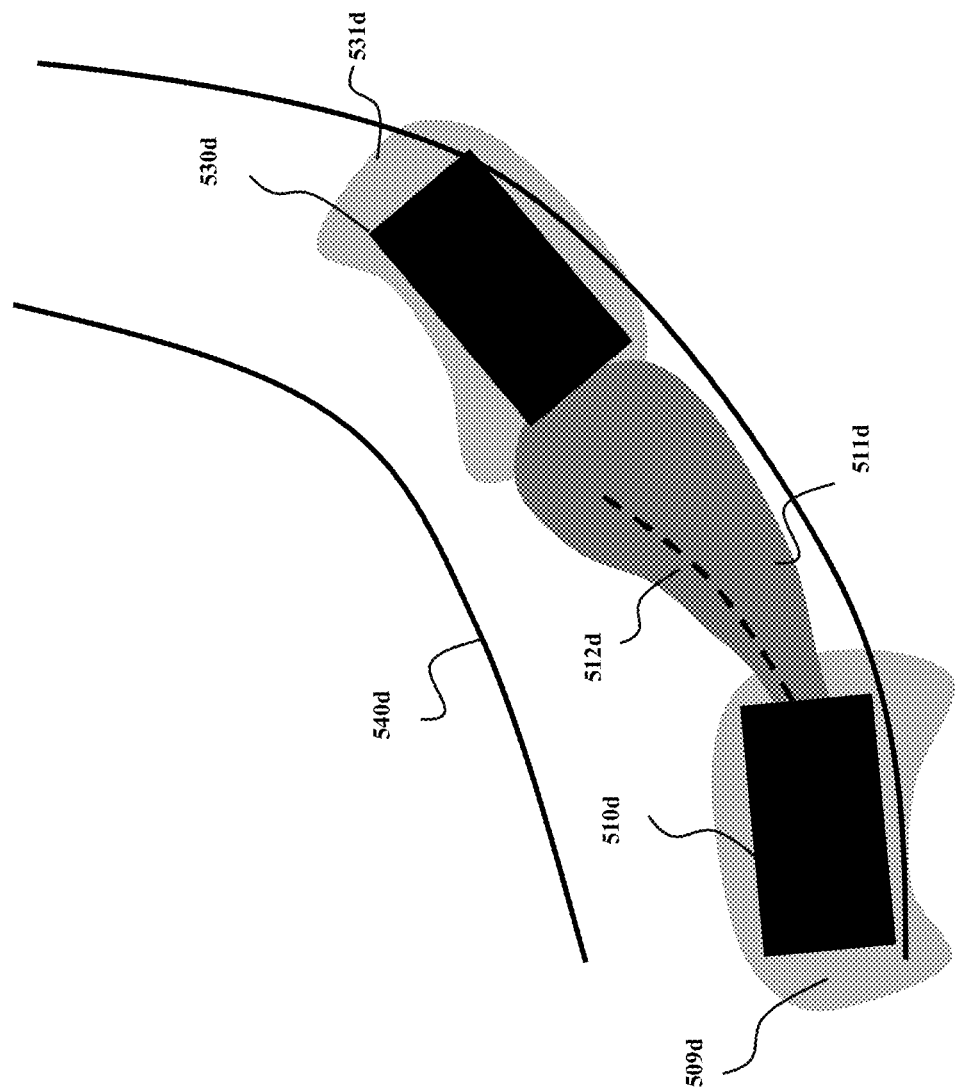
FIG. 5D shows an example of modeling a motion of a vehicle using a probability density function according to one embodiment.

FIG. 5D shows an example of modeling a motion of a vehicle using a probability density function according to one embodiment. In the scenario of FIG. 5D, the vehicle being measured 510d is behind the host vehicle 530d. The lane boundaries 540d are also shown. There are a number of uncertainties in the prediction. For example, sensor uncertainties or uncertainties in the map of the road network, which combined gives uncertainties 509d on the position and velocity of the measured vehicle and uncertainties 530d on the position and velocity of the host vehicle. In addition, even if the feasible trajectory 512d is generated from vehicles measured in the past, it is not entirely certain that the measured vehicle 510*d*, even though the trajectory 512*d* has been considered as similar, will follow the feasible trajectory. Thus, the prediction inherently has additional uncertainties 511*d*.

In cases where the feasible trajectories are generated from a kinematic model of the car, probability distributions are important because they can be used for defining a margin of error with respect to the feasible trajectory. Furthermore, probability distributions can be used to reduce the number of feasible trajectories that need to be generated. As long as a trajectory is within the probability density of a feasible trajectory, it can also be considered a feasible trajectory. Doing in such a way reduced the number of needed feasible trajectories and reduce computations.

As shown in FIG. 5D, the motion of the vehicle is modeled in the form of a probability density function 512*d* of the state of the vehicle, wherein the initial condition 509*d* of the probability density function 512*d* can be determined from sensor data. This reasoning can be reversed, instead modeling the feasible trajectory as generated from a probability density of possible states of the vehicle, wherein the probability density defines a margin of error for when a measured vehicle is considered similar to the feasible trajectory.

Figure 6A:
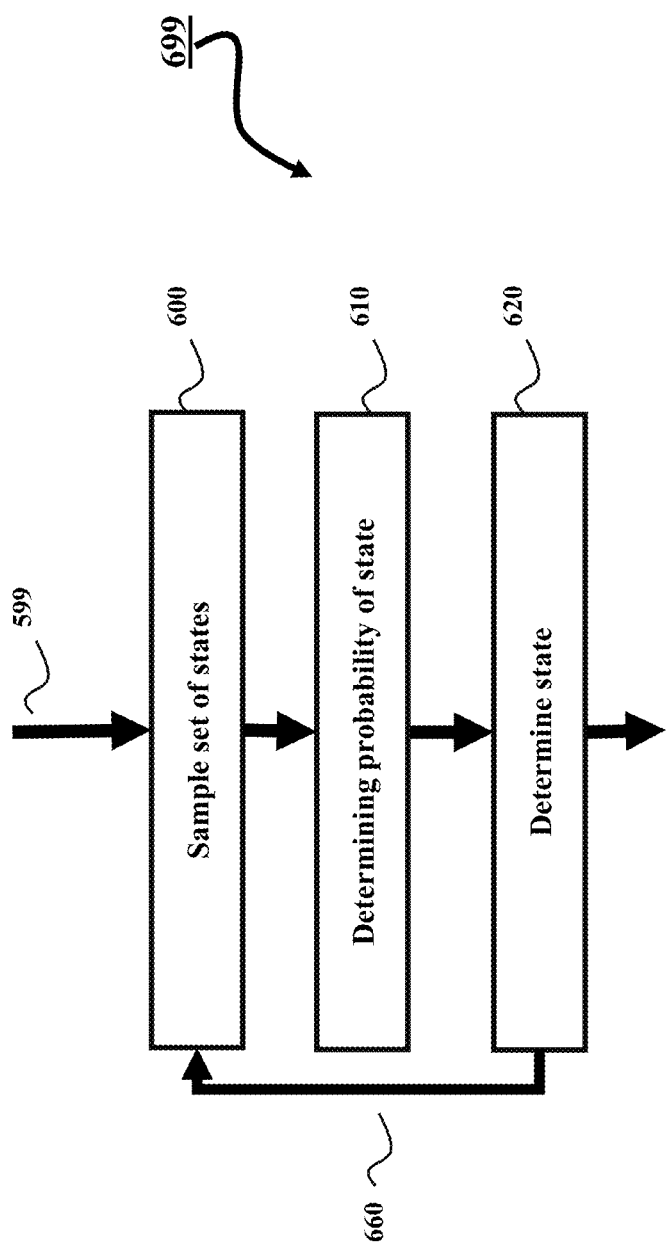
FIG. 6A shows a flowchart of a method for generating a feasible trajectory according to some embodiments.

FIG. 6A shows a flowchart of a method 699 for generating a feasible trajectory according to some embodiments. The method determines iteratively a sequence of states specifying the motion of the vehicle from an initial hypothetical state of the vehicle to a target lane of the vehicle, while satisfying various intentions of a hypothetical driver as outlined in FIG. 2D. In different embodiments, the initial hypothetical state is a state of vehicles observed in the past and/or wherein the initial hypothetical state is the state corresponding determined during a previous iteration of the method.

The motion is defined by the state transitions connecting states of the vehicle. Each state includes a location, a velocity, and a heading of the vehicle. The motion is determined iteratively until a termination condition is met, for example, for a time period, for a predetermined number of iterations, or as long as the feasible trajectory is in the region of interest. In an autonomous vehicle, the termination condition can be set in relation to the planning horizon in the motion planner 240. For a manually driven vehicle, the termination condition can be set in relation to the visibility of the road segment. An iteration of the method of FIG. 6A includes the following steps.

Figure 6B:
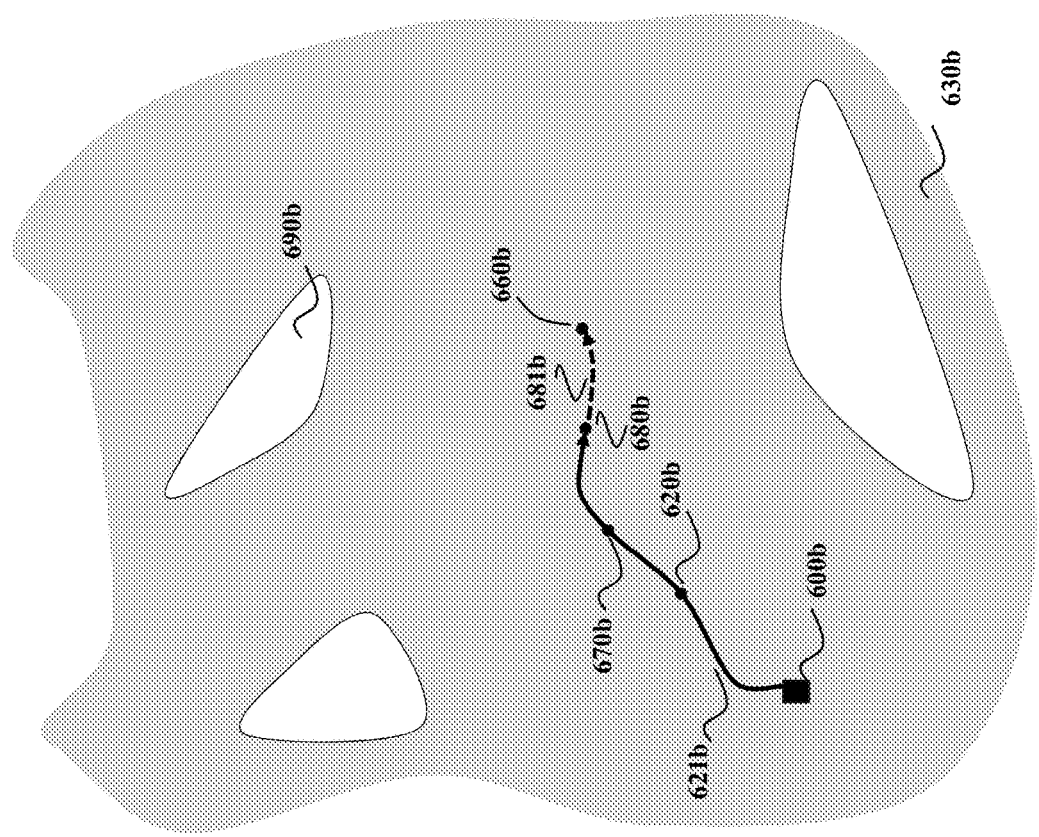
FIG. 6B shows a graph of state transitions that defines the motion of the vehicle according to some embodiments.

FIG. 6B shows a graph of state transitions that defines the motion of the vehicle according to some embodiments. The method determines 600, starting from an initial state, a set of sampled states and a corresponding set of state transitions such that the state and transition satisfy static and dynamic constraints on the state of the vehicle. For example, the method starts at the state 680*b*, determines the state 660*b*, and the state transition 681*b* in FIG. 6B, while avoiding obstacles 690*b* and satisfying constraints 630*b* on the motion of the vehicle from the map of the environment.

Figure 6C:
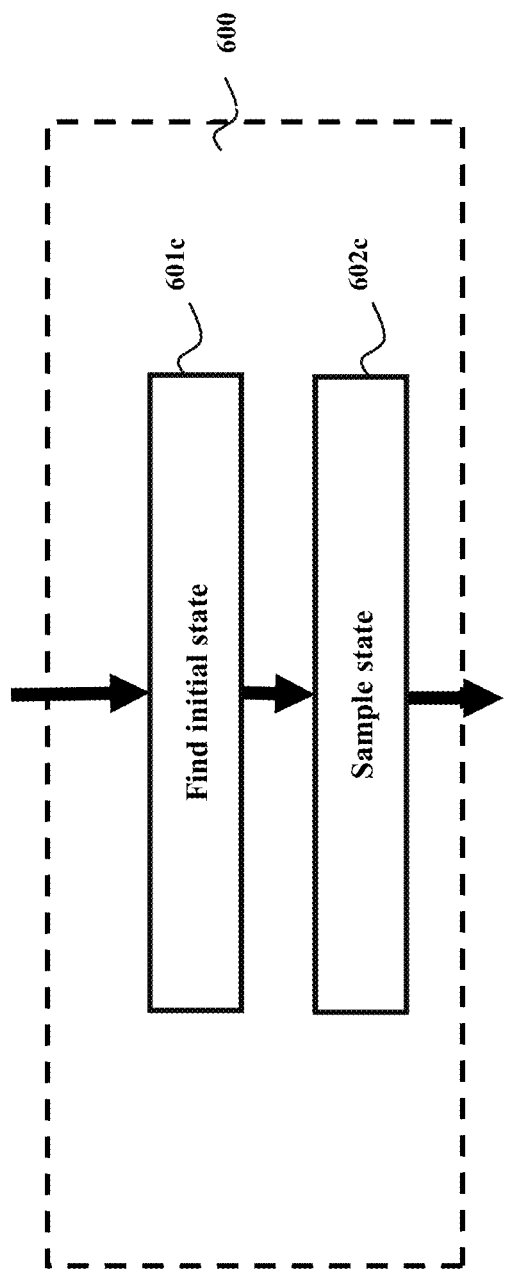
FIG. 6C shows a flowchart of an exemplar implementation of the determining the set of sampled states according to one embodiment.

FIG. 6C shows a flowchart of an exemplar implementation of the determining the set of sampled states 600 according to one embodiment. The determining 600 uses information about the environment, the states determined using previous iterations, and the intentions in FIG. 2D. Examples of the previous states include the nodes 680*b*, 670*b*, 620*b*, and the initial state 600*b* in FIG. 6B.

The exemplar implementation performs initial determining of a state 601*c*. If it is the first iteration of the method, the initial state is the current hypothetical state of the vehicle, with an uncertainty associated with it. The uncertainty can be in the shape of a confidence interval, or it can be in the shape of several possible locations. Such a scenario arises, for example, if the sensing system provides very uncertain measurements, or if the map is uncertain. Otherwise, the initial state is determined by previous iterations of the method.

The method samples 602*c* a set of N predicted states $\{x_k^i\}_{i=1}^N$, satisfying the constraints on the motion of the vehicle, where N can be predetermined or made adaptive. In some embodiments of the invention, the states 602*c* are generated from a fictive noise source of the dynamical system, that is, from $w_k$, with the nominal input $u_k$ as the mean value of the input. For example, $w_k$ can be chosen as arising from a Gaussian distribution $w_k \sim \mathcal{N}(u_k, Q_k)$, or it can be chosen as a probability density function (PDF) tailored to the particular intention associated with the feasible trajectory.

In other embodiments of the invention, the sampled states 602*c* are generated by using the intentions in FIG. 2D. The intentions of the driver are known beforehand, and the states generated from the noise source of the dynamical system corrected to better satisfy the intentions. For example, a probabilistic function $q(x_{k+1}|x_k, y_{k+1})$ can be used to generate states, where q is a function of the state at time index k+1, given the state at the time index k and the specification at time index k+1.

As a particular example, if both $w_k$ and $e_k$ are additive, Gaussian PDFs, q can be chosen as $$q(x_{k+1}|x_k^i, y_{k+1}) = p(x_{k+1}|x_k^i, y_{k+1}) = \mathcal{N}(x_{k+1}|x_{k+1}^i, (\textstyle\sum)_{k+1}^{-1}),$$

where $x_{k+1}^i = f(x_k^i) + w_k^i + L_k^i(y_{k+1} - H_k^i f(x_k^i))$, $$\textstyle\sum_{k+1}^i = ((H_k^i)^T R_{k+1}^{-1}(H_k^i) + Q_k^{-1})^{-1},$$

and $L_k^i = \left(Q_k(H_k^i)^T (H_k^i Q_k(H_k^i)^T + R_{k+1}^{-1})^{-1}\right)$, $H_k^i = \frac{\partial h}{\partial x}$, that is, the state can be generated as a random sample from the noise source of the dynamical system, propagated through the mathematical description of the vehicle, modified with a deterministic term to account for the deviation from the intention, and the corresponding state is predicted using this modified term.

In one embodiment of the invention, the generation of the sampled states 802*c* and prediction of corresponding state is executed in a loop, where the number of iterations is determined beforehand. In another embodiment, the generation of states 602*c* is done based on the intended trajectory T time steps ahead in time. For example, the number of iterations T can be determined as a fixed number of steps, or the iterations can be determined as a function of the resolution of the sensors of the sensing system 230. When 602*c* is executed T time steps, the states are generated according to all locations corresponding to the intended trajectory from time index k+1 to time index k+T, that is, $q(x_{k+1}|x_k, y_{k+1}, \ldots, y_{k+T})$.

Figure 6D:
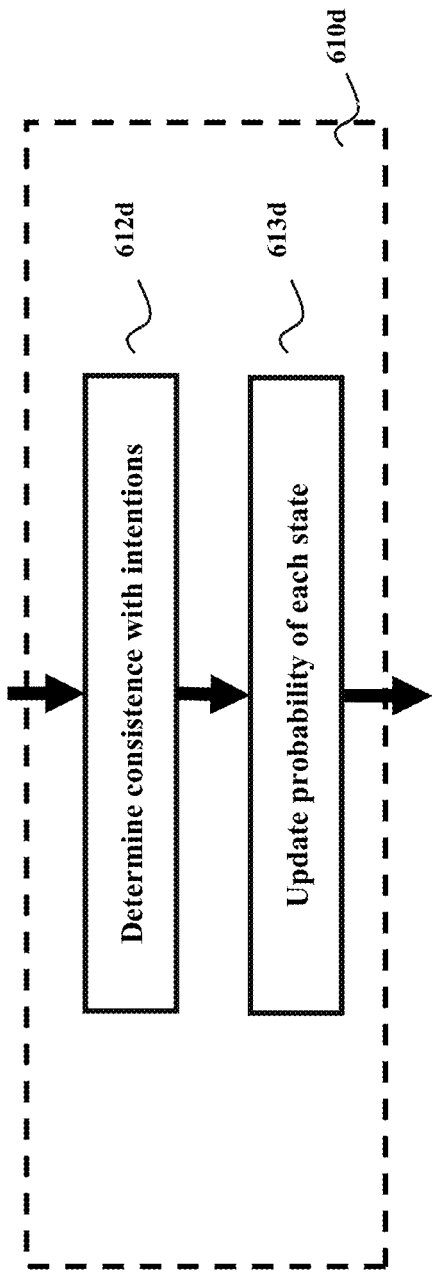
FIG. 6D shows a flowchart of the method that determines the probability of state transitions according to some embodiments.

FIG. 6D shows a flowchart of the method 610*d* that determines the probability of each state transition producing movement to a state satisfying the constraints on the motion of the vehicle according to some embodiments. When determining the probability of each state, consistence of the state with the intention is determined 612*d* and the probability of each state is computed 613*d*.

In some embodiments, the determining 612d is done as a combination of the PDF of the intentions/constraints, $p(y_{k+1}|x_{k+1}^i)$, the next state, and the probability $\omega_k^i$ of the state determined during the previous iteration. For example, if states are generated according to the dynamic model of the vehicle, the probabilities are proportional to the PDF of the specifications, that is, $\omega_{k+1}^i \propto p(y_{k+1}|x_{k+1}^i)\omega_k^i$. As another example, if the sampling of states is done according to $p(x_{k+1}|x_k^i,y_{k+1})$, the probabilities are proportional to the prediction of the PDF of the intended trajectories, that is, $\omega_{k+1}^i \propto p(y_{k+1}|x_k^i)\omega_k^i$. In one embodiment, the probabilities are normalized in such a way that they represent a PDF.

In one embodiment of the invention, states with nonzero but low probability are in some time steps replaced with states with higher probabilities. For example, one embodiment generates a new set of states in such a way that the probability of generating $x_k^i$ is $\omega_k^i$. In another embodiment, the replacement is performed whenever the inverse square sum of the probabilities is below some predefined threshold. Doing in such a manner ensures that only probably good states are used.

The determining 620 of state can be done in several ways. For example, one embodiment determines states by using a weighted average function to produce the state as $x_{k+1} = \sum_{i=1}^N \omega_{k+1}^i x_{k+1}^i$. Another embodiment determines state as the state with highest probability, that is, $i=\text{argmax } \omega_{k+1}^i$. Additionally or alternatively, one embodiment determines the state by averaging over a fixed number m<N of sampled states.

Figure 6E:
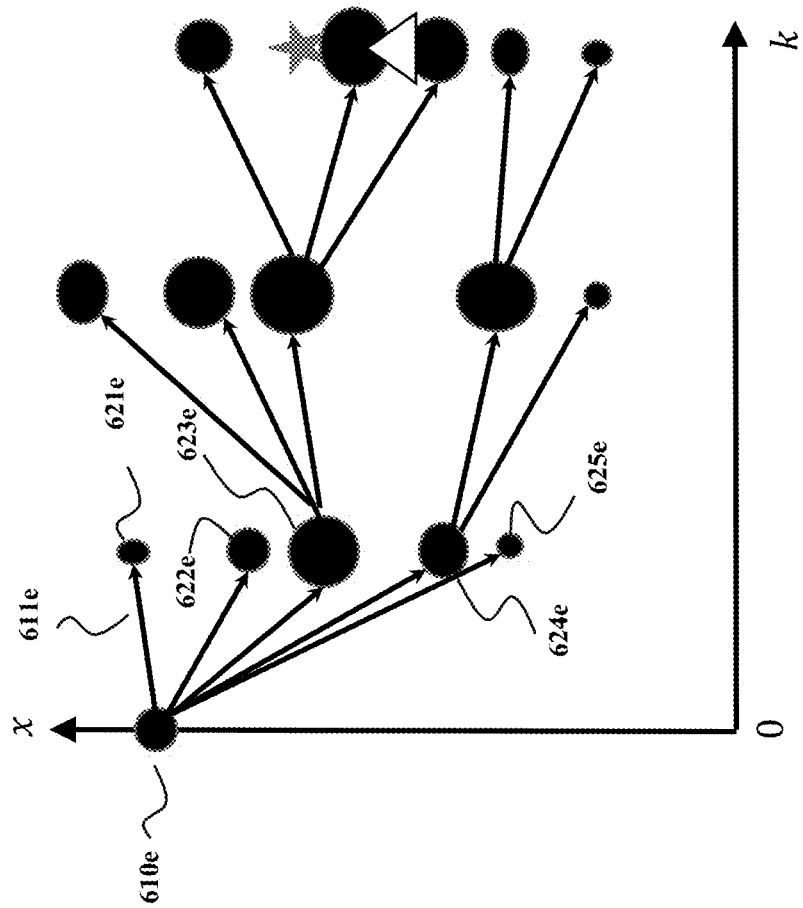
FIG. 6E shows a simplified schematic of iteration of the method producing one state for each discrete section of probability distribution function according to some embodiments.

FIG. 6E shows a simplified schematic of iteration of the method producing one state for each discrete section of the PDF. In this example, the states 623e and 624e are selected for a single iteration. Selection of multiple states for at least one iteration results in the set of motions connecting the current state of the vehicle with the target state of the vehicle. To that end, one embodiment selects from the set of motions the motion optimizing a cost function.

Figure 6F:
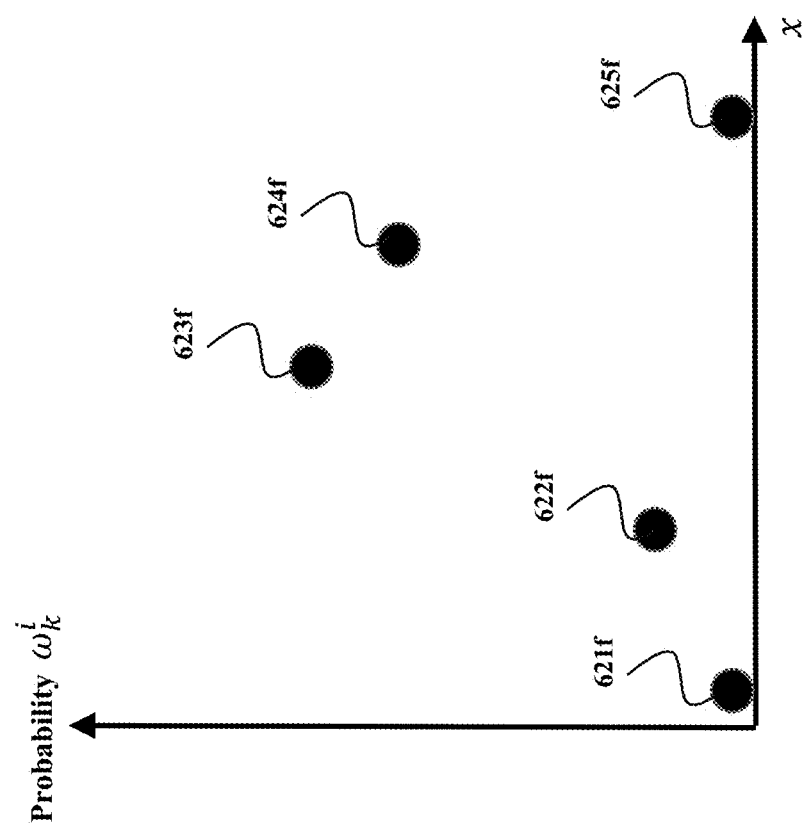
FIG. 6F shows possible assigned probabilities of the five states at the first iteration in FIG. 6E.

FIG. 6F shows possible assigned probabilities of the five states at the first iteration in FIG. 6E. Those probabilities 621f, 622f, 623f, 624f, and 625f are reflected in selecting the sizes of the dots illustrating the states 621e, 622e, 623e, 624e, and 625e.

Referring back to FIG. 6E, the states 623e and 624e become the initial state for the next iteration that again produces five sampled state transitions of the vehicle from the initial states to next states.

Figure 6G:
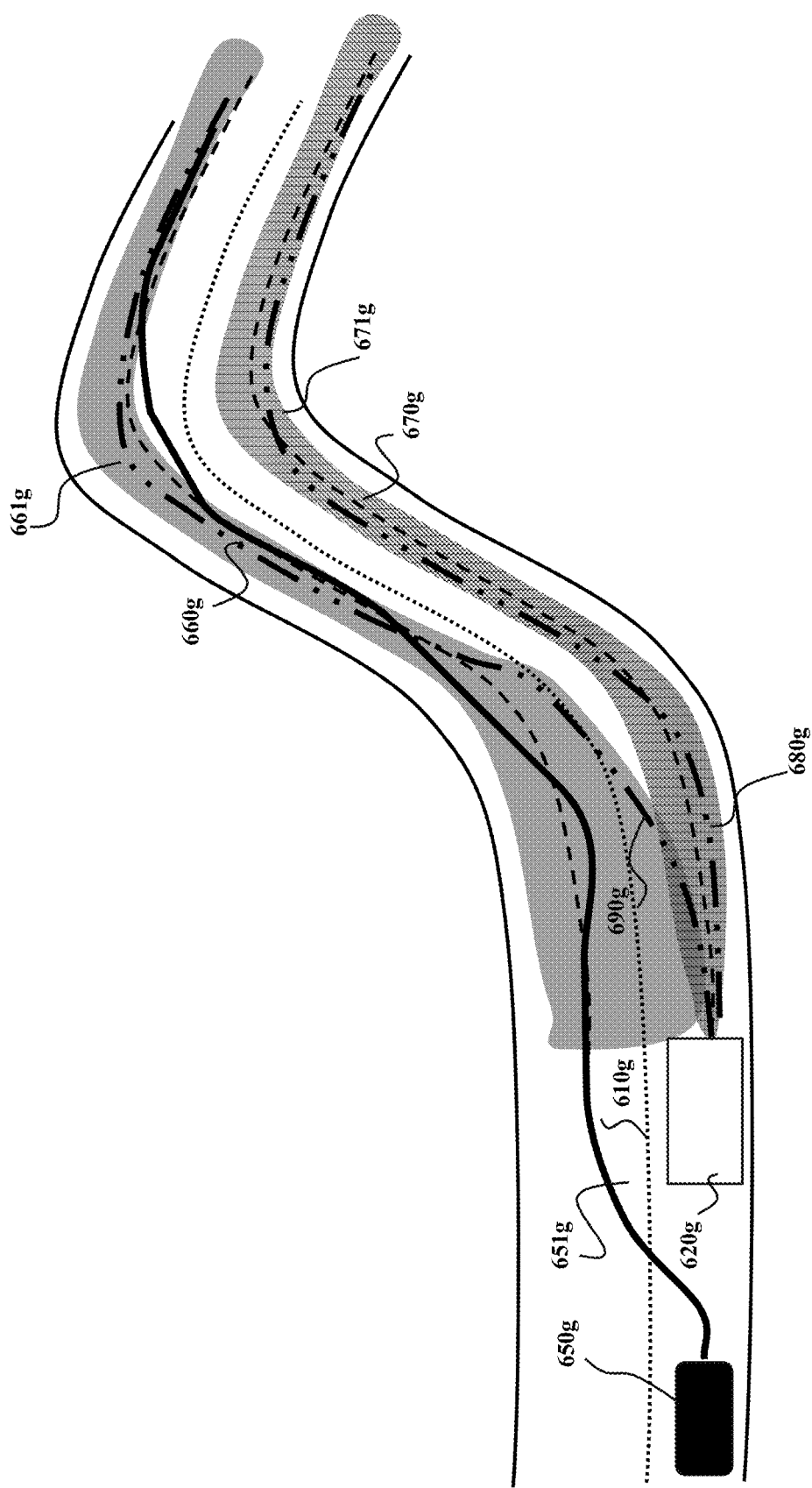
FIG. 6G shows a schematic describing determination of the probability of a feasible trajectory to intersect with the trajectory of the host vehicle according to some principles employed by several embodiments.

FIG. 6G shows a schematic describing how to determine probability of a feasible trajectory to intersect with the trajectory of the host vehicle according to some principles employed by several embodiments. The measured vehicle is at the current state 650g on a two-lane road with lane divider 610g, with a hypothetical vehicle 620g in the right lane. There are two feasible trajectories 690g and 680g that previously have been generated in the determining 699 by using the respective intentions 660g and 670g of following the left and right lane, respectively. In this case, there are two feasible trajectories since there are two trajectories in the subset of feasible that are similar to the currently measured vehicle. The feasible trajectories include a probability distribution 661g and 671g that account for that it is possible that the vehicle is not exactly following the feasible trajectory.

Figure 6H:
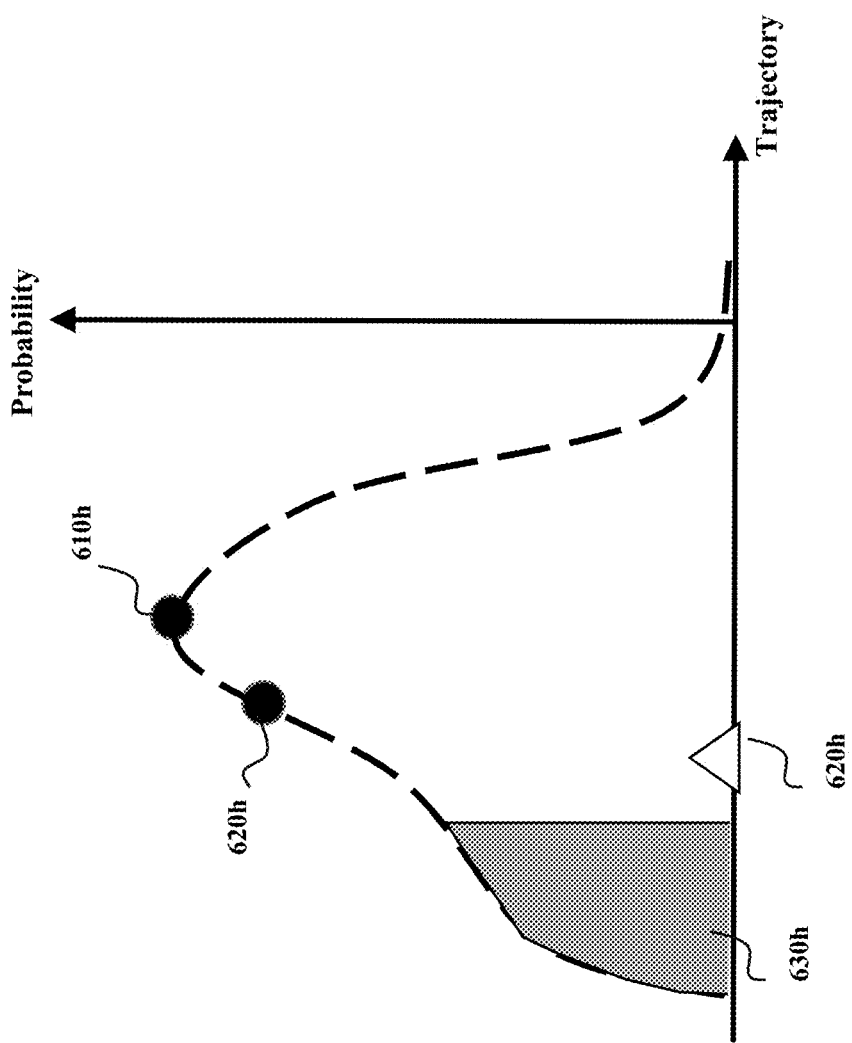
FIG. 6H shows a schematic illustrating determining the feasible trajectory using total probability density according to one embodiment.

FIG. 6H shows a schematic illustrating determining the feasible trajectory using total probability density according to one embodiment. For example, in one implementation, the feasible trajectory is determined from the total probability density as the trajectory with highest probability 610h. In an alternative implementation, the feasible trajectory is determined as the aggregated states 620h over the density. Additionally, or alternatively, in one embodiment, the probability is determined as how large portion 630h of the PDF at a particular time instant is intersecting with the trajectory of the host vehicle. For instance, if the whole PDF intersects, the probability is 1.

The probability of a feasible trajectory intersecting with the intended trajectory of the host vehicle is not enough to determine the level of risk of a feasible trajectory, because it does not tell whether any vehicle will follow the feasible trajectory. Consider again FIG. 5A, in which there are 8 possible trajectories for a vehicle 510a to follow. The hypothetical vehicles to generate trajectories 520a are not consistent with the measured vehicle 510a, so the subset of feasible trajectories includes 530a. Assume that the probability of intersection of 530a with the trajectory of the host vehicle has been determined. Then, in one embodiment the level of risk is determined as a combination of the probability of the feasible trajectory to intersect with the trajectory of the host vehicle and the probability of the feasible trajectory to be followed by at least one vehicle.

One embodiment classifies the time-series signal of the vehicle to produce a driving intention of the vehicle and updates the probabilities of each feasible trajectory from the subset based on consistency of the feasible trajectories from the subset with the intention of the vehicle. The idea is that previously observed data can be used to predict the decisions made in the future. For example, by learning what characteristics of a driver that changes lane are, future lane changes can be predicted.

Figure 7A:
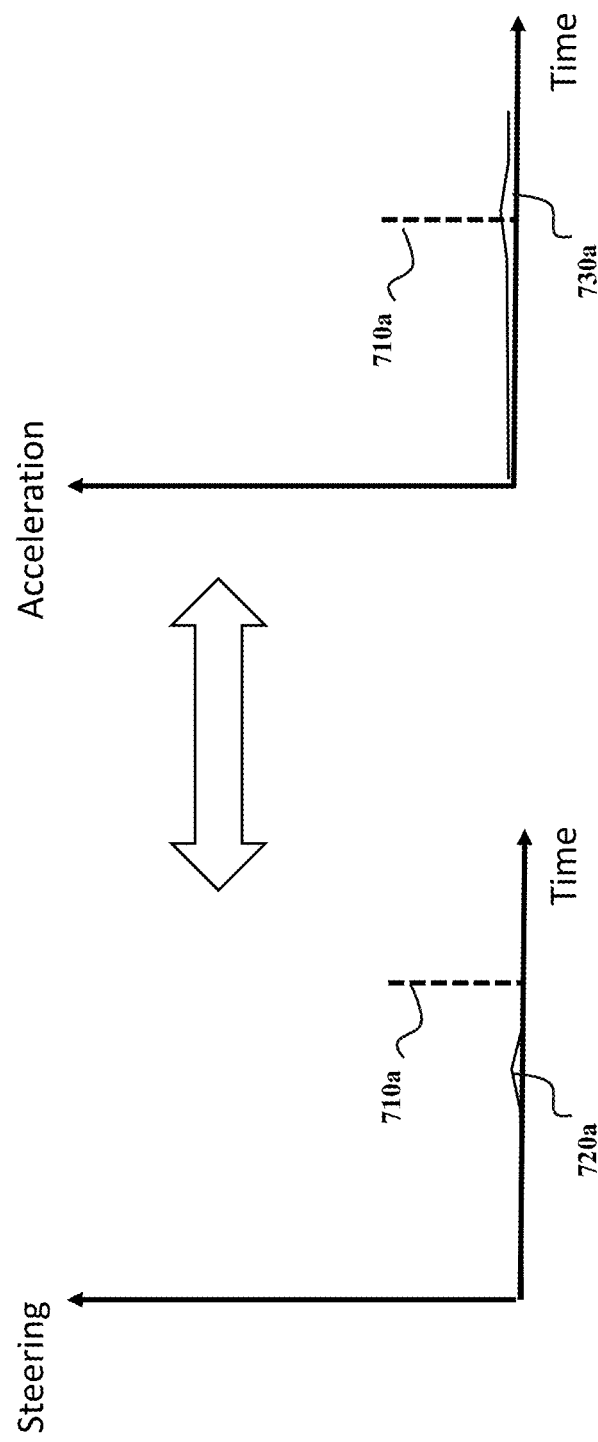
FIG. 7A shows a schematic of a time-series signal including a steering trajectory of the steering wheel of the vehicle and an acceleration trajectory of the vehicle according to some embodiments.

FIG. 7A shows a schematic of a time-series signal including a steering trajectory of the steering wheel of the vehicle and an acceleration trajectory of the vehicle according to some embodiments. In the example of FIG. 7A, the driver initiates a lane change at time 710a. However, it can be noted that before the lane change, there is a slight increase 720a in the steering angle for a short moment. This can, for example, be due to that the driver of the vehicle looks over the shoulder to see whether there are any vehicles in the blind-spot. Furthermore, it can be seen that the acceleration 730a slowly starts to increase before the lane change is initiated and then maintained throughout the lane change. Hence, information from recorded data can be used to predict future intentions.

Figure 7B:
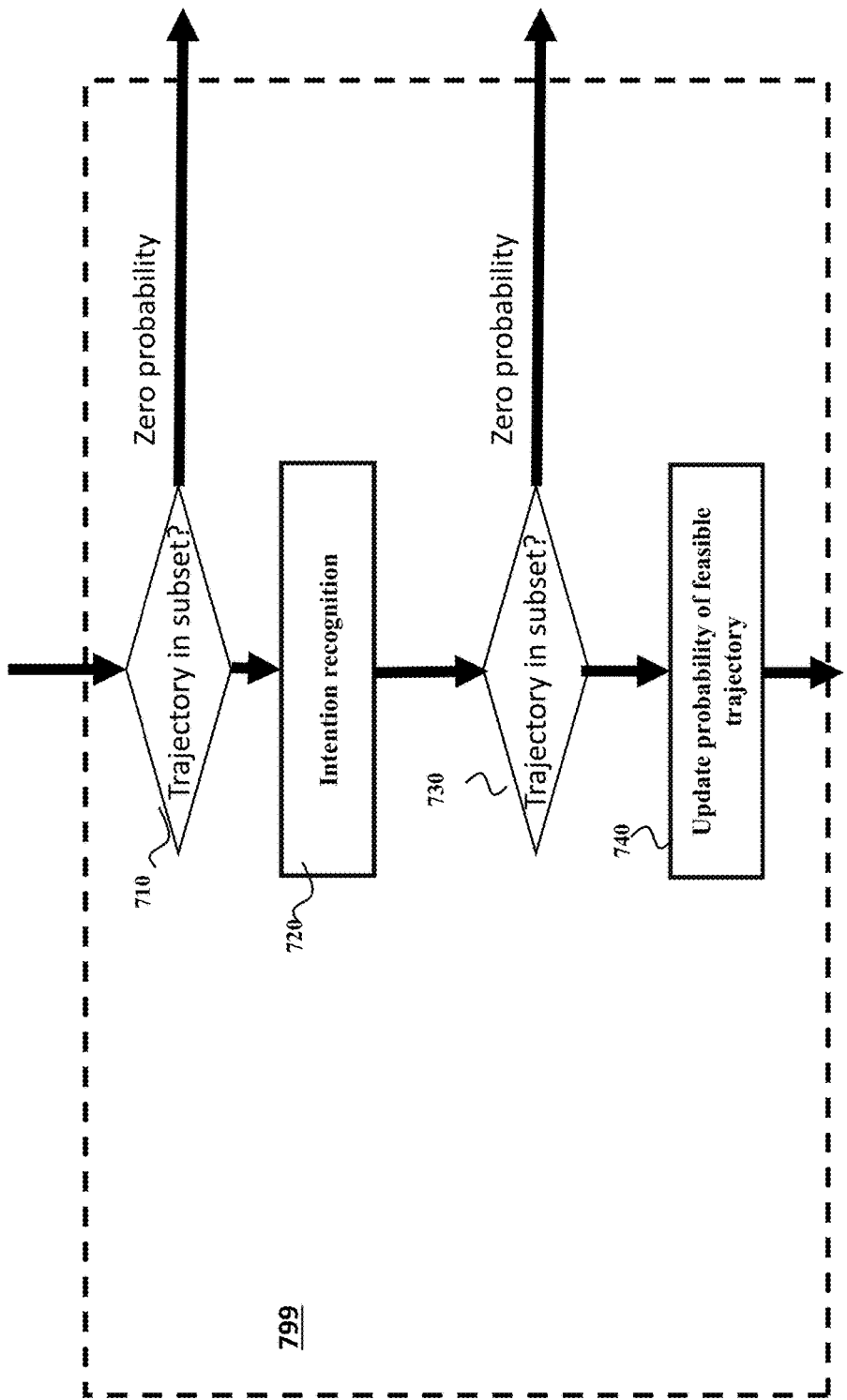
FIG. 7B shows a flowchart of an exemplar implementation of a method for updating the probabilities of each feasible trajectory to be followed based according to some embodiments.

FIG. 7B shows a flowchart of an exemplar implementation of a method 799 for updating the probabilities of each feasible trajectory from the subset to be followed based on consistency of the feasible trajectories from the subset with the intention of the vehicle according to some embodiments. The determining 710 extracts the feasible trajectories from the subset. Then, the method determines 720 the intention of the vehicle.

FIG. 8A shows an example of a set of driver's intentions considered by one embodiment. This embodiment considers the following intentions: turn left 810, turn right 820, drive straight 830, change lane left 840, change lane right 850, in addition to brake 860, accelerate 870, or maintain velocity 880. Some embodiments learn how to choose intention by observing behavior of many vehicles. For example, one embodiment uses vehicle data with known intentions to train a random forest algorithm, which is based on deep decision trees, another embodiment trains a support vector machine, and a third embodiment trains a neural network.

Then the method determines 730 the new subset of trajectories consistent with the intention determined in 720. For example, if there is no trajectory in the subset that has the intention to turn left 810, it gets excluded from the subset to form a new subset. Finally, the method updates 740 the probability of the feasible trajectory to be followed by the vehicle. In one embodiment, the probability is updated by the probability 610h of the feasible trajectory generated from 610h, that is, the probability of the most likely trajectory. In another embodiment, the updating is done by the weighted average 620h over the PDF of the feasible trajectory.

Figure 8B:
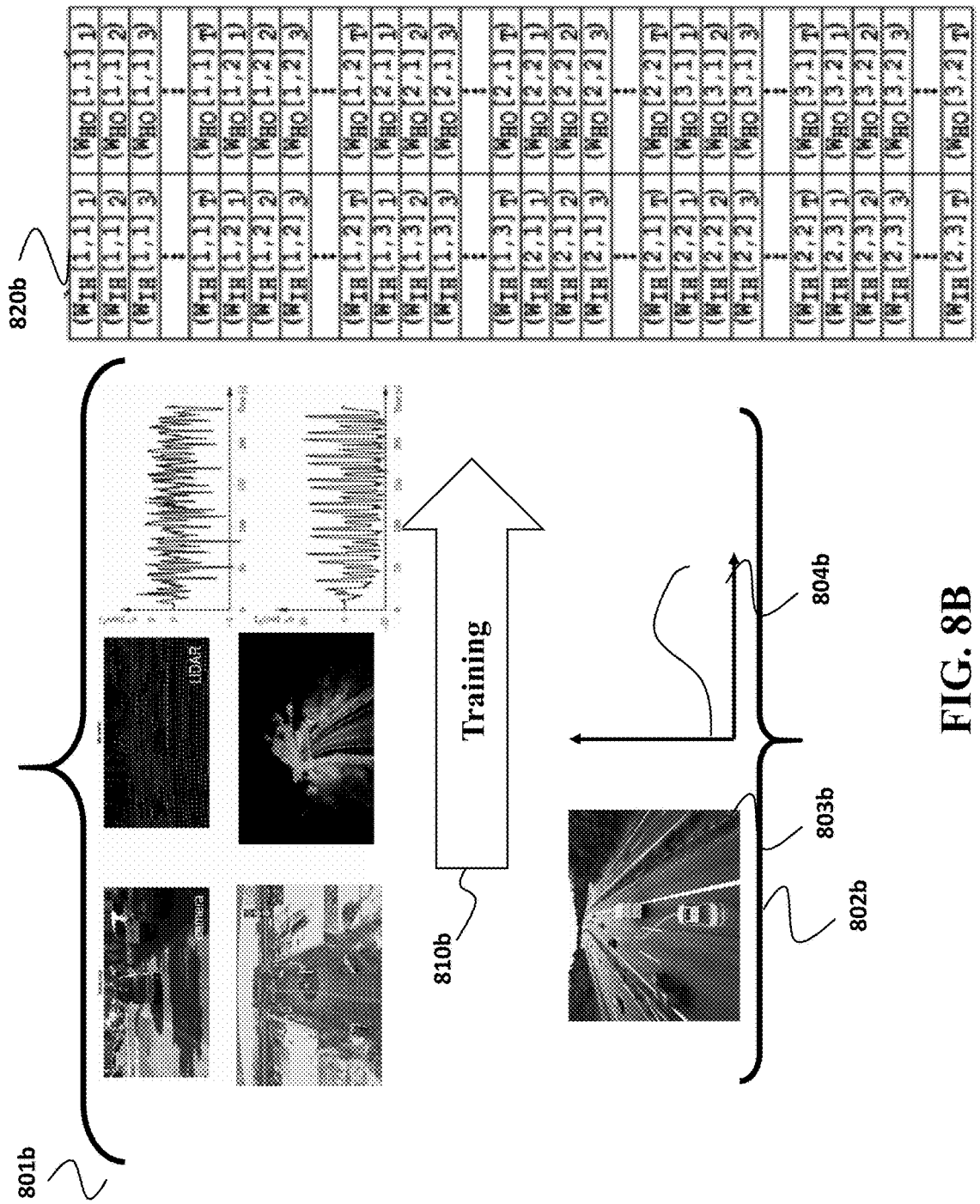
FIG. 8B shows a schematic of training a neural network according to some embodiments.

FIG. 8B shows a schematic of training a neural network according to some embodiments. The training 810c uses a training set of sequences of sensor inputs 801c and corresponding intentions 802c to produce the behavior 820c of the neural network. In general, training a machine-learning algorithm comprises applying a training algorithm, sometimes referred to as a "learning" algorithm. A training set may include one or more sets of inputs and one or more sets of outputs with each set of inputs corresponding to a set of outputs. A set of outputs in a training set comprises a set of outputs that are desired, for example for a neural network, to generate when the corresponding set of inputs is inputted to the neural network.

For example, one embodiment trains a neural network. The training 810c involves mapping a sequence of sensor data 801c to an intention, such as change lane left 840 and change velocity 860, 870 of the vehicle.

The training data can include input time-series signals from the onboard sensors and the intention of the driver. The input data can be labeled according to the current intention that is being trained.

When training a deep decision tree, random forest, to have enough training data, one embodiment employs a sliding window approach for training. For example, one embodiment computes the feature values from the measured vehicle's lateral position; and longitudinal and lateral speed. If not measured directly, these variables can be estimated from a filter, such as particle filter or Kalman filter, using sensors such as radars and cameras, GPS, and the road map. From the state variables and the road geometry, one embodiment computes normalized lateral position; normalized longitudinal speed; and lateral speed. The raw data of these variables are subject to noise, for example from sensor noise and imperfections in the road map. Thus, for the robustness, one embodiment calculates the six statistical values of the variables: the minimum, maximum, mean, variance, the difference between the first and the second value, and the difference between the last and the second to last value. Furthermore, to include changes of the values in the feature vector, one embodiment divides the dataset to four sub-datasets and computes the same statistical values of each sub-dataset. Doing in such a way ensures robust training of the random forest.

Figure 8C:
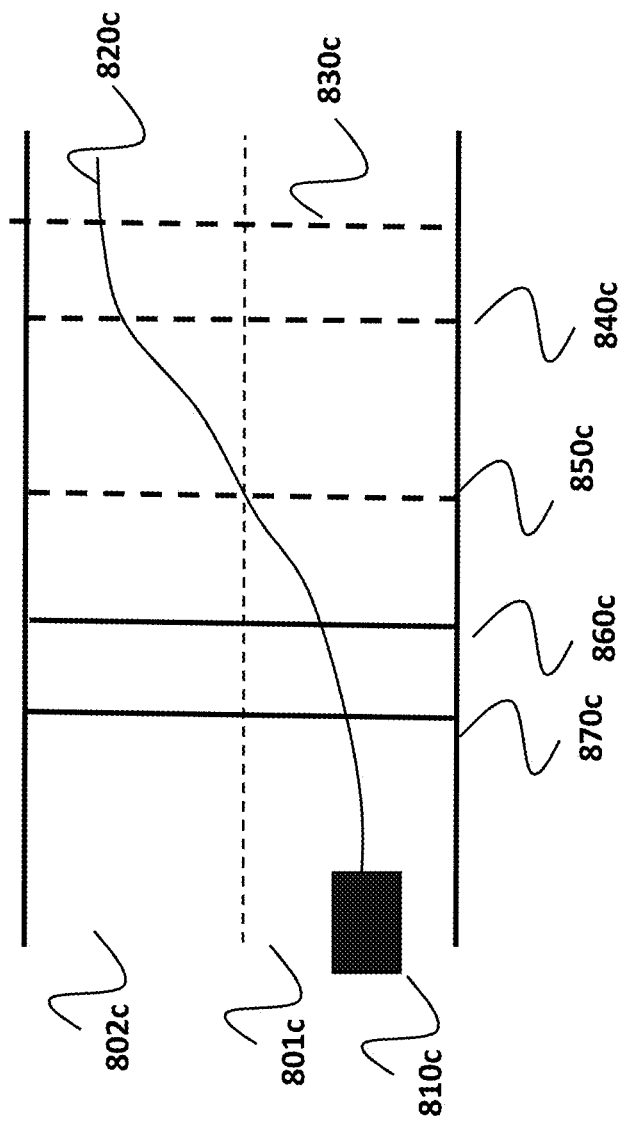
FIG. 8C shows an illustration of a method for dividing the dataset for training according to one embodiment.

FIG. 8C shows an illustration of a method for dividing the dataset for training according to one embodiment. In an example of FIG. 8C, a driver of a vehicle 810c intends to change lane from lane 801c to lane 802c. Define the time the vehicle crosses the lane boundary 850c by $t_{cross}$ and the vehicle reaches the center 840c of lane 802c as $t_{reach}$. The window starts at $t_{cross}-t_1$ and ends at $t_{cross}+t_2$. The window size, $t_1+t_2$, needs to be large enough so that the classification algorithm can capture the driver intention. Within the time window, one embodiment moves a sub-window with length $t_{window}$, corresponding to lines 860c and 870c, \extract feature from the state variables in the sub-window, and generate a dataset. The data in each sub-window is labeled as "Change Lane" (i.e., change left 840c or change right 850c depending on the direction) if the data start is between $t_{cross}-t_1$ and $t_{reach}$, and stay in lane 830c if it starts after $t_{reach}$. Note that when the training data has no lane changes, one embodiment extracts the dataset with length $t_1+t_2$ and label all the dataset as stay in lane 830c.

One embodiment takes the probability of a feasible trajectory to intersect with a probability of a feasible trajectory to be followed, and weights these probabilities together. For instance, one embodiment uses a weighted mean of the probabilities.

Several embodiments of the invention use the level of risk to adjust the trajectory of the host vehicle. For instance, in one embodiment, if the level of risk is above some threshold, the time-to-collision between the feasible trajectory of the vehicle with the trajectory of the motion planner of the host vehicle is calculated. One embodiment renders the level of risk as time-to-collision to the driver of the vehicle as a warning sound, signal on the dashboard, or both, then adjusts the trajectory in response to commands on input commands received from the driver. In another embodiment, the level of risk above a threshold is propagated to a collision avoidance module of the host vehicle and adjusts the trajectory in response to input commands received from the collision avoidance module. For instance, the collision avoidance module can be the motion planner 240, or another controller 260 of the vehicle. The input commands can include steering wheel and throttle commands.

The feasible trajectory and associated PDF can be used directly in a motion planner. For example, the motion planner can directly discard motion plans that are likely to end up where the feasible trajectory is located. The threat assessor can also utilize information from the motion planner to more efficiently compute feasible trajectories. For example, if the motion planner determines that the autonomous vehicle should travel with a certain velocity in a certain lane, it is more important to focus the generation of feasible trajectories in that lane.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Additionally, or alternatively, the above-described embodiments can be implemented as a non-transitory computer readable storage medium embodied thereon a program executable by a processor for performing a method of various embodiments.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for controlling a host vehicle traveling in an environment shared with a set of vehicles, wherein the method uses a processor coupled with stored instructions implementing the method, wherein the instructions, when executed by the processor carry out at least some steps of the method, comprising:
   controlling a motion of the host vehicle in the environment according to a trajectory;
   determining a set of feasible trajectories of hypothetical vehicles traveling in a driving area of the host vehicle defined by a state of the motion of the host vehicle and a map of the environment;
   generating a time-series signal indicative of motion of each vehicle in the set of vehicles traveling in the environment;
   determining, using the trajectory of the host vehicle, a probability of each feasible trajectory to intersect with the trajectory of the host vehicle;
   determining, using the time-series signals, a probability of each feasible trajectory to be followed by at least one vehicle;
   determining a level of risk of each feasible trajectory as a combination of the probability of the feasible trajectory to intersect with the trajectory of the host vehicle and the probability of the feasible trajectory to be followed by at least one vehicle; and
   adjusting the trajectory of the host vehicle in response to assessing the levels of risk of the feasible trajectories.

2. The method of claim 1, wherein the trajectory and the feasible trajectories are the functions of time defining a velocity of the host vehicle and relative velocities of the vehicles with respect to the velocity of the host vehicle.

3. The method of claim 1, wherein the feasible trajectories are determined using a kinematic model of a motion of a hypothetical vehicle, comprising:
   generating the feasible trajectories for different velocities of the hypothetical vehicles at different locations of the environment traveling with different driving intentions selected from a set of driving intentions.

4. The method of claim 3,
   wherein the locations of the hypothetical vehicles are selected according to the map of the environment,
   wherein the set of driving intentions includes one or combination of a turn left intention, a turn right intention, a drive straight intention, a change lane left intention, a change lane right intention, a brake intention, an accelerate intention, and a maintain velocity intention, and
   wherein the feasible trajectories are determined for each hypothetical vehicle performing different driving intentions permitted by the environment that move the hypothetical vehicle into the driving area of the host vehicle.

5. The method of claim 1, further comprising:
   assigning a vehicle to a subset of feasible trajectories consistent with the time-series signal of the vehicle within a margin of error; and
   determining the probability of the vehicle to follow each feasible trajectory from the subset based on statistics on driving intentions represented by the feasible trajectories.

6. The method of claim 5, wherein at least one feasible trajectory includes a probability density of possible states of the vehicle following the feasible trajectory defining the margin of error.

7. The method of claim 5, further comprising:
   classifying the time-series signal of the vehicle using a road traffic in the environment to produce a driving intention of the vehicle; and
   updating the probabilities of each feasible trajectories from the subset based on consistency of the feasible trajectories from the subset with the intention of the vehicle.

8. The method of claim 7, wherein the classifying uses one or combination of a neural network, a support vector machine, and a deep decision tree.

9. The method of claim 1, wherein the combination includes a weighted average of the probability of the feasible trajectory to intersect with the trajectory of the host vehicle and the probability of the feasible trajectory to be followed by at least one vehicle.

10. The method of claim 1, wherein the adjusting comprises:
    selecting a feasible trajectory with the level of risk above a threshold;
    rendering an information indicative of the risk of the feasible trajectory to a driver of the host vehicle; and
    adjusting the trajectory in response to an input command received from the driver.

11. The method of claim 1, wherein the adjusting comprises:
    selecting a feasible trajectory with the level of risk above a threshold; and
    submitting an information indicative of the risk of the feasible trajectory to a collision avoidance module of the host vehicle; and
    adjusting the trajectory in response to an input command received from the collision avoidance module.

12. A control system of a host vehicle for controlling motion of the host vehicle traveling in an environment shared with a set of vehicles, comprising:
    a controller to control a motion of the host vehicle in the environment according to a trajectory;
    at least one sensor to generate a time-series signal indicative of motion of each vehicle in the set of vehicles traveling in the environment;
    a threat assessor including a processor
      to determine a set of feasible trajectories of hypothetical vehicles traveling in a driving area of the host vehicle defined by a state of the motion of the host vehicle and a map of the environment, and
      to determine a level of risk of each feasible trajectory as a combination of a probability of the feasible trajectory to intersect with the trajectory of the host vehicle and a probability of the feasible trajectory to be followed by at least one vehicle; and
    a motion planner to adjust the trajectory of the host vehicle in response to assessing the levels of risk of the feasible trajectories.

13. The control system of claim 12, further comprising:
a memory to store the map of the environment, a kinematic model of a motion of a hypothetical vehicle, and a set of driving intentions including one or combination of a turn left intention, a turn right intention, a drive straight intention, a change lane left intention, a change lane right intention, a brake intention, an accelerate intention, and a maintain velocity intention;
wherein the threat assessor generates the feasible trajectories for each hypothetical vehicle at different locations of the environment and traveling with different driving intentions selected from a set of driving intentions to move each hypothetical vehicles into the driving area of the host vehicle.

14. The control system of claim 12, wherein the threat assessor
assigns each vehicle to a subset of feasible trajectories consistent with the time-series signal within a margin of error; and
determines the probability of the vehicle to follow each feasible trajectories from the subset based on a number of the feasible trajectories in the subset and statistics on driving intentions represented by the feasible trajectories.

15. The control system of claim 14, wherein at least one feasible trajectory includes a probability density of possible states of the vehicle following the feasible trajectory defining the margin of error.

16. The control system of claim 14, wherein the threat assessor
classifies, using one or combination of a neural network, a support vector machine, and a deep decision tree, the time-series signal of the vehicle using a road traffic in the environment to produce a driving intention of the vehicle; and
updates the probabilities of each feasible trajectories from the subset based on consistency of the feasible trajectories from the subset with the intention of the vehicle.

17. A non-transitory computer readable storage medium embodied thereon a program executable by a processor for performing a method, the method comprising:
controlling a motion of the host vehicle in the environment according to a trajectory;
determining a set of feasible trajectories of hypothetical vehicles traveling in a driving area of the host vehicle defined by a state of the motion of the host vehicle and a map of the environment;
generating, using at least one sensor located on the host vehicle, a time-series signal indicative of motion of each vehicle in the set of vehicles traveling in the environment;
determining, using the trajectory of the host vehicle, a probability of each feasible trajectory to intersect with the trajectory of the host vehicle;
determining, using the time-series signals, a probability of each feasible trajectory to be followed by at least one vehicle;
determining a level of risk of each feasible trajectory as a combination of the probability of the feasible trajectory to intersect with the trajectory of the host vehicle and the probability of the feasible trajectory to be followed by at least one vehicle; and
adjusting the trajectory of the host vehicle in response to assessing the levels of risk of the feasible trajectories.

18. The medium of claim 17, wherein the method further comprising:
generating the feasible trajectories for different velocities of the hypothetical vehicles at different locations of the environment traveling with different driving intentions selected from a set of driving intentions including one or combination of a turn left intention, a turn right intention, a drive straight intention, a change lane left intention, a change lane right intention, a brake intention, an accelerate intention, and a maintain velocity intention;
assigning a vehicle to a subset of feasible trajectories consistent with the time-series signal of the vehicle within a margin of error; and
determining the probability of the vehicle to follow each feasible trajectories from the subset based on statistics on driving intentions represented by the feasible trajectories.

19. The medium of claim 18, wherein the method further comprising:
classifying the time-series signal of the vehicle using a road traffic in the environment to produce a driving intention of the vehicle; and
updating the probabilities of each feasible trajectories from the subset based on consistency of the feasible trajectories from the subset with the intention of the vehicle.

* * * * *